(12) United States Patent
Miller

(10) Patent No.: US 6,499,883 B2
(45) Date of Patent: *Dec. 31, 2002

(54) TILTING PAD FOR BEARINGS

(75) Inventor: William H. Miller, Cohoes, NY (US)

(73) Assignee: WHM Holding Corporation, Cohoes, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,793

(22) Filed: Mar. 12, 2001

(65) Prior Publication Data

US 2002/0110295 A1 Aug. 15, 2002

Related U.S. Application Data

(60) Continuation-in-part of application No. 09/373,672, filed on Aug. 13, 1999, now Pat. No. 6,200,034, which is a continuation-in-part of application No. 09/040,621, filed on Mar. 18, 1998, now Pat. No. 6,079,102, which is a division of application No. 08/828,979, filed on Mar. 31, 1997, now Pat. No. 5,772,335.

(51) Int. Cl.[7] ............................................. F16C 17/03
(52) U.S. Cl. ................ 384/117; 384/309; 384/122; 384/308
(58) Field of Search ........................... 384/100, 107, 384/121, 122, 306–308, 117, 309–312

(56) References Cited

U.S. PATENT DOCUMENTS

| | | | |
|---|---|---|---|
| 2,731,305 A | 1/1956 | Wilcock | 384/307 |
| 3,687,506 A | 8/1972 | Dee | |
| 3,807,814 A | 4/1974 | Stopp | 384/312 |
| 3,887,245 A | 6/1975 | Rouch | |
| 3,891,281 A | 6/1975 | Jenness | |
| 3,982,796 A | 9/1976 | Hill | |
| 4,059,318 A | 11/1977 | Hollingsworth | |
| 4,327,950 A | 5/1982 | Czuszak | |
| 4,533,262 A | 8/1985 | Pedersen | 384/420 |
| 4,544,285 A * | 10/1985 | Shapiro et al. | 384/306 |

(List continued on next page.)

FOREIGN PATENT DOCUMENTS

EP    0 170 572    3/1985

OTHER PUBLICATIONS

Tanaka et al., "A three–dimensional analysis of thermohydrodynamic performance of sector–shaped, tilting–pad thrust bearings," Jul. 1, 1983, Abstract.

(List continued on next page.)

Primary Examiner—Thomas R. Hannon
(74) Attorney, Agent, or Firm—Heslin Rothenburg Farley & Mesiti P.C.

(57) ABSTRACT

A thrust bearing tilting pad has face with a border region including an engagement surface and defining a pocket with generally longitudinal sidebars and a bottom. The pad has leading and trailing portions, with the face extending generally longitudinally therebetween. The leading and trailing portions can be positioned upstream and downstream, respectively, relative to a direction of movement of a runner. The pad is pivotally supported by (e.g., mechanical and/or hydrostatic) pivot and can cooperate with one or more other pads and fluid within a housing to hydrodynamically and mechanically support the runner in an axial position. In another embodiment, the pad tilts free of mechanical engagement with other pads. The leading portion can define an entrance to the pocket and the sidebars can converge along the direction of motion of the runner. The pocket hydrodynamically increases pressure on the runner during rotation, and generates pressure effecting on the face counteraction force about the pivot and upstream relative to the rotation direction in order to counteract spragging force. The pocket can also have a generally tapered profile or an abrupt step.

70 Claims, 19 Drawing Sheets

U.S. PATENT DOCUMENTS

| | | | | |
|---|---|---|---|---|
| 4,568,204 A | * | 2/1986 | Chambers | 384/152 |
| 4,597,676 A | | 7/1986 | Vohr et al. | 384/114 |
| 4,919,549 A | | 4/1990 | Lawson et al. | 384/113 |
| 5,007,745 A | * | 4/1991 | Ball et al. | 384/307 |
| 5,030,015 A | | 7/1991 | Baker et al. | 384/117 |
| 5,288,153 A | | 2/1994 | Gardner | 384/311 |
| 5,372,431 A | | 12/1994 | Ide | 384/122 |
| 5,529,399 A | | 6/1996 | Holze | 384/107 |
| 5,547,287 A | | 8/1996 | Zeidan | 384/117 |
| 5,702,186 A | | 12/1997 | Hackstie et al. | 384/117 |
| 5,772,335 A | | 6/1998 | Miller | 384/117 |
| 5,876,125 A | * | 3/1999 | Wyndorps et al. | 384/122 |
| 5,879,085 A | * | 3/1999 | Ball et al. | 384/122 |
| 6,079,102 A | | 6/2000 | Miller | 29/898.07 |
| 6,089,754 A | | 7/2000 | Wilkes et al. | 384/122 |
| 6,200,034 B1 | * | 3/2001 | Miller | 384/117 |

OTHER PUBLICATIONS

Kocur, John Anthony, Jr., "Dynamic analysis of liquid–lubricated hydrostatic journal," Jan. 1, 1990, Abstract.

Etison et al., "Analysis of a hydrodynamic thrust bearing with incomplete film," Aug. 1, 1980, Absract.

Gregory, E.W., "The optimum pocket geometry for a finite hydrodynamic thrust bearing," Jan. 1, 1975, Abstract.

Nypan et al., "Optimization of conical hydrostatic bearing for minimum friction," Oct. 1, 1971, Abstract.

* cited by examiner

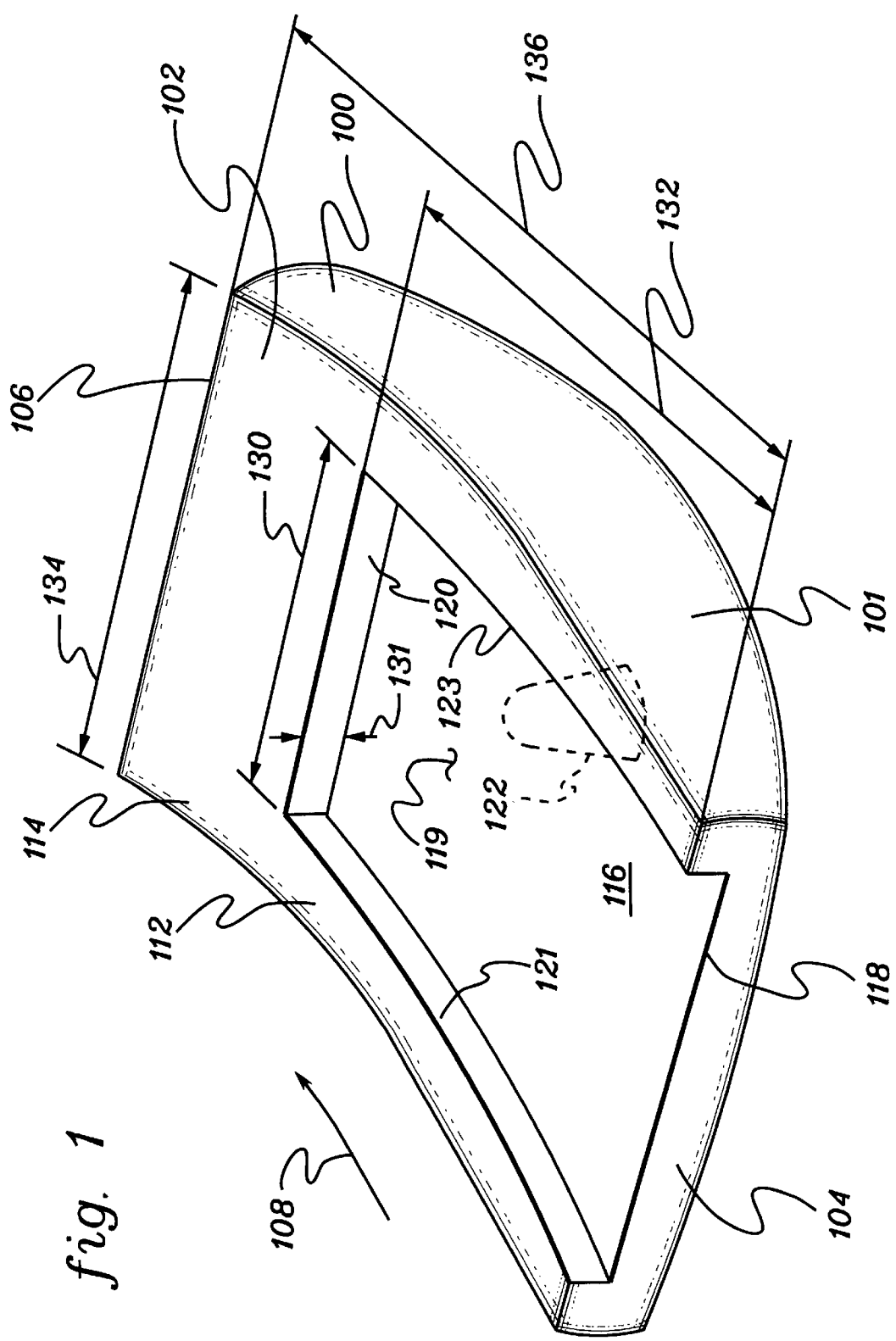

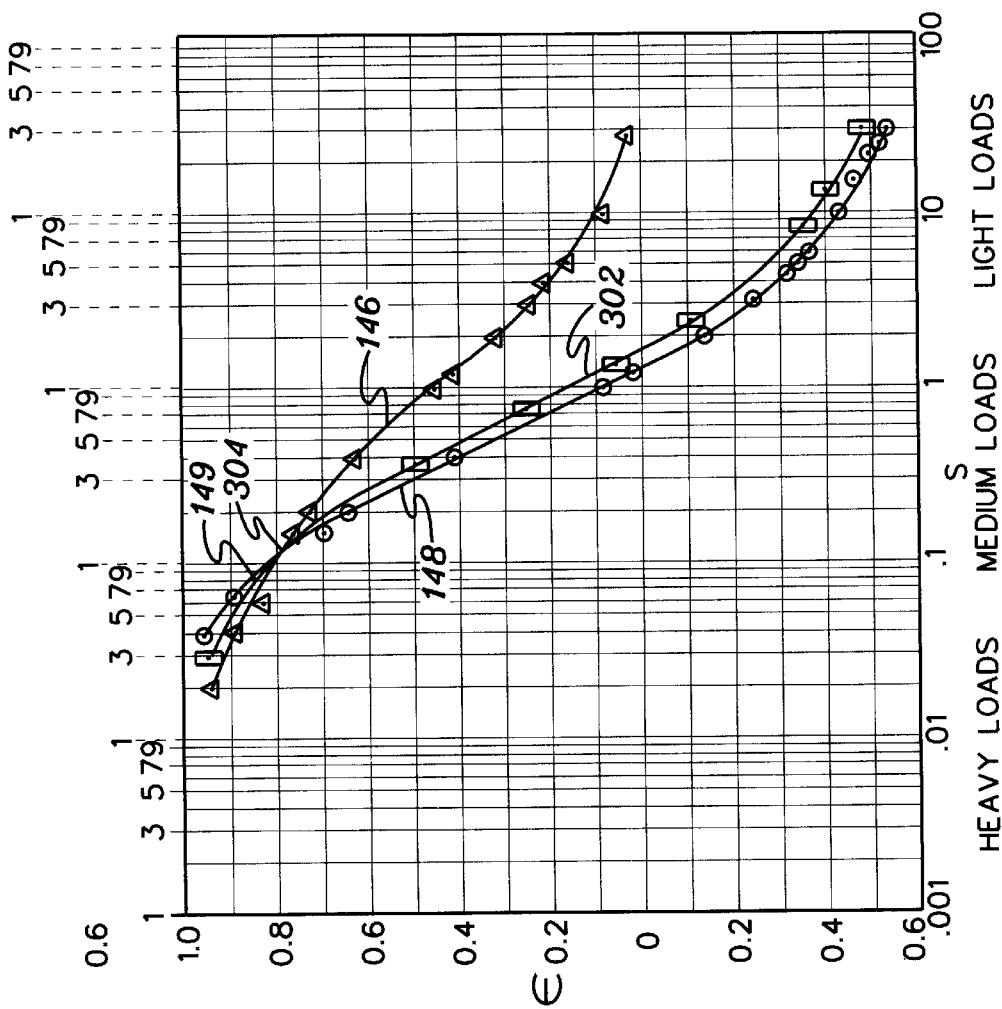
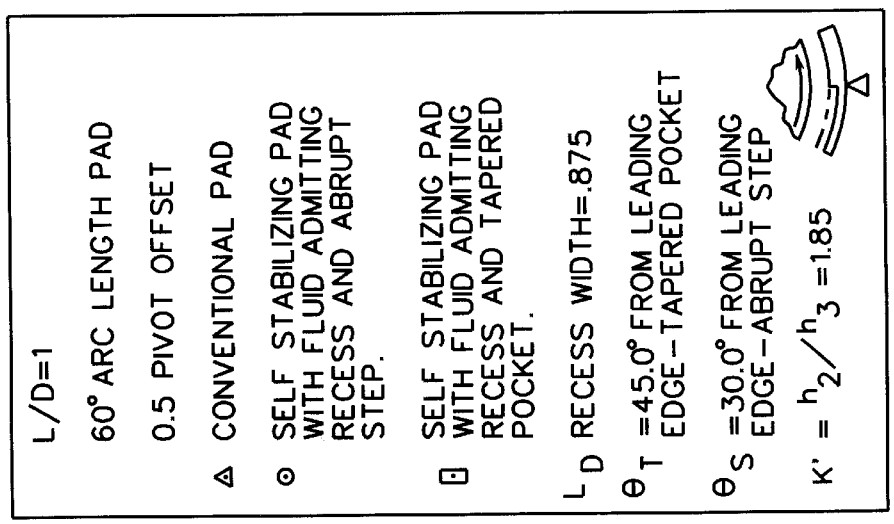
fig. 3

TILTING PAD FOR BEARINGS

CROSS-REFERENCE TO RELATED APPLICATIONS

This application is a continuation-in-part of commonly-owned U.S. patent application Ser. No. 09/373,672 (by William H. Miller, filed Aug. 13, 1999, entitled "Self-Stabilizing, True-Tilting Pad With Generally Tapered Pocket for Journal Bearing," issued Mar. 13, 2001 as U.S. Pat. No. 6,200,034), which is a continuation-in-part of commonly-owned U.S. Pat. No. 09/040,621 now U.S. Pat. No. 6,079,102 (to William H. Miller, filed Mar. 18, 1998, entitled "Journal Bearing Method Employing Self-Stabilizing, True-Tilting Pad With Abruptly-Stepped Pocket", issued Jun. 27, 2000), which is a division of commonly-owned U.S. Pat. No. 08/828,979 U.S. Pat. No. 5,772,335 (to William H. Miller, filed Mar. 31, 1997, entitled "Self-Stabilizing, True-Tilting Pad with Abruptly-Stepped Pocket For Journal Bearing," issued Jun. 30, 1998), each of which is hereby incorporated herein by reference in its entirety.

TECHNICAL FIELD

This invention relates generally to tilting pads and, in particular, to tilting pads having a pocket for bearings such as journal bearings and thrust bearings.

BACKGROUND ART

Hydrodynamic pads cooperate amongst themselves and with oil, or other liquid or gaseous fluid, in the same housing to form an overall bearing for a journal or shaft to be rotated within the housing. The shaft commonly rotates with its axis oriented either vertically or horizontally. Each hydrodynamic pad typically defines a concave arc on its inner face. Further, this arc faces the convex surface of the shaft. Also, a mechanical pivot supports the pad.

Instead of the mechanical pivot, one can support the pad using a hydrostatic pivot. An example of such a hydrostatic pivot can be configured in accordance with the disclosure of U.S. Pat. No. 4,059,318 to Hollingsworth, Nov. 22, 1977, which is hereby incorporated herein by reference in its entirety.

A conventional tilting pad is an example of a tilting type of hydrodynamic pad. Furthermore, conventional tilting pads are widely acknowledged to be the most stable type of hydrodynamic pad. An example of an overall bearing configuration for a shaft having horizontal axis orientation could include two lower, tilting pads and one upper, stationary pad, in accordance with the disclosure of U.S. Pat. No. 4,597,676 to Vohr et al., Jul. 01, 1986, which is hereby incorporated herein by reference in its entirety.

Hydrodynamic pads work through a wedge effect in the fluid between the pads and the convex surface of the shaft. Such fluid is often descriptively called the squeeze film. This fluid wedge yields a hydrodynamic lift acting on the convex surface of the shaft and directed away from the arc of the pad. One can recognize occurrences of this wedge effect in common events such as a person water-skiing or an automobile tire hydroplaning.

Introducing preload is a usual method for enhancing the fluid wedge effect. For example, one can assemble the pads to form a circular bearing having a first radius larger than the radius of a particular shaft to be supported. The radius at the pivot is less that the pad machined radius, and thereby the pads are assembled more closely around the convex surface of the shaft. Nevertheless, the arc of each individual pad still corresponds to the first radius. This allows for the preload, as discussed below.

Considering an instance when the shaft is positioned close to an individual pad and symmetrically with respect to the arc of that pad, one can understand that the convex surface of the shaft is physically closer to the arc of the pad at the center of the arc than at either end of the arc. Analysis of the region from the leading edge to the center of the arc reveals this arrangement gives rise to a converging hydrodynamic fluid wedge between the convex surface and the arc.

Introducing offset of the pivot with respect to the center of the arc length of the pad is another means of enhancing the fluid wedge effect. Typically, the pivot can be offset longitudinally downstream between about fifty to sixty-five percent of the arc length. One can employ offset to increase the fluid wedge effect through modification of the relationship of moments between the leading and trailing lever arms of the pad. Preload, discussed above, can be combined with offset to further increase the fluid wedge effect.

Tilting by the conventional tilting pad further enhances the wedge effect. Namely, the conventional tilting pad desirably accentuates the converging wedge by permitting the leading edge of the pad to pivot away from the convex surface of the shaft.

The overall bearing, formed by the circular arrangement of the pads, has an overall radius. As discussed above with respect to preload, the arc of each pad could correspond to a first radius different from the theoretical overall bearing radius into which the pads are assembled. Eccentricity measures the deviation from an ideal condition in which the axis of the shaft is collinear with the axis of the overall bearing. In this ideal condition, one can say the shaft is centered and experiences zero load. Furthermore, in this ideal condition, the shaft has maximum clearance with respect to the overall bearing.

As one deviates from this ideal condition, into many possible non-ideal conditions, by loading the shaft, eccentricity increases. Moreover, the clearance of the shaft with respect to a particular pad of the bearing decreases. During operation at large loads, the shaft assumes maximal operating eccentricity, assuming a non-failure/non-contact condition. At contact during operation, the eccentricity equals one, so the shaft has zero clearance over the particular pad. This operational failure condition allows the shaft to undergo forced mechanical engaging between its convex surface and the face of the particular pad. Of course, at start-up and shut-down, that is, before and after operational rotation of the shaft, mechanical contact occurs without operational failure.

Hydrodynamic pads are prevalent in turbo-machinery such as pumps, compressors, and turbines. For instance, consider the case of a turbine blade on its shaft. Here, turbine efficiency is determined, in part, by how little clearance one must design for the tip of the rotating blade to pass over the stationary housing. This clearance represents a loss because it provides a fluid leakage path. Namely, fluid passing through the leakage path makes no positive contribution because it escapes work. This loss is characteristic of all turbo-machinery having some type of rotating impeller. The performance or effectiveness of the rotational operation of the turbo-machinery is strongly inversely proportional to the amount of clearance the designer must provide for operation of the impeller or blades mounted on the shaft. So, one desires to minimize the required operating clearance.

During rotation, the shaft tends to orbit elliptically, as is well-known in the art. This elliptical orbit further contributes to the amount of clearance a designer must provide for the operation of the shaft during its rotation. Accordingly, one desires to minimize both the eccentricity of the shaft position and also the ellipticity of its orbit, during rotation.

For dynamic considerations, a convenient representation of bearing characteristics is by spring and damping coefficients. For a horizontal shaft axis orientation, these are obtained as follows.

First, the equilibrium position to support the given load is established by computer solution of the well-known Reynolds equation. Here, horizontal and vertical directions are represented by respective X and Y directions. Second, a small displacement is applied to the shaft in the X direction. A new solution of Reynolds equation is obtained and the resulting forces in the X and Y directions are produced. The spring coefficients are as follows:

$$K_{xy} = \frac{\Delta F_x}{\Delta y}$$

$$K_{yy} = \frac{\Delta F_y}{\Delta y}$$

where $\Delta F_x$=difference between X forces in the displaced and equilibrium positions where $\Delta F_y$=difference between Y forces in the displaced and equilibrium positions where $\Delta y$=displacement from equilibrium position in Y direction $K_{xy}$=stiffness in X direction due to Y displacement $K_{yy}$=stiffness in Y direction due to Y displacement Third, the shaft is returned to its equilibrium position and a Y displacement applied. Next, similar reasoning produces $K_{xx}$ and $K_{yx}$. The damping coefficients $D_{ij}$ are produced in a like manner. Namely, velocities, rather than displacements, in the X and Y directions are consecutively applied with the shaft in the equilibrium position. So, for most fixed bearing configurations, there are a total of eight coefficients: four spring (or stiffness) and four damping.

The total force on the shaft is:

$$F_i = K_{ij} X_j + D_{ij} \dot{X}_j$$

$F_i$=force in the $i^{th}$ direction, where repeated subscripts imply summation, for example:

$$K_{ij} X_j = K_{ix} X + K_{iy} Y$$

The spring and damping coefficients represent a linearization of bearing characteristics. Here, one should determine the equilibrium position accurately because the coefficients are valid only about a small displacement region.

The magnitude of the off-diagonal terms of the spring and damping coefficients matrices reflects the degree of cross-coupling in the bearing configuration. One should note that the matrix of the spring coefficients is commonly referred to as the stiffness matrix. For example, consider the following common geometrical and operating conditions of a single-piece, two axial groove bearing for a horizontal shaft.

| Shaft Diameter, D | 5 in. |
| --- | --- |
| Bearing Length, L | 5 in. |
| Active Pad Angle, $\theta_p$ | 160° (10° grooves on either side of pad) |
| Radial Clearance, c | 0.0025 in. |
| Operating Speed, N | 5000 rpm |
| Lubricant Viscosity, $\mu$ | $2 \times 10^{-6}$ lb-sec/in.$^2$ |
| Eccentricity Ratio, $\epsilon$ | 0.5 |
| Load Direction | Vertical Down |

For these conditions, a computer solution yields the following results:

| Bearing Load, w | 20,780 lbs. |
| --- | --- |
| Horsepower Loss, hp | 15.51 |
| Minimum Film Thickness, $h_M$ | 0.00125 in. |
| Side Leakage, $q_s$ | 0.941 gpm |

Spring and Damping Coefficients: (The signs, positive or negative, of the coefficients conform to the rotor dynamic codes utilized.)

Spring Coefficients: (lbs/in.)

$$\begin{bmatrix} K_{xx} & K_{xy} \\ K_{yx} & K_{yy} \end{bmatrix} = \begin{bmatrix} 12.14 \times 10^6 & 4.64 \times 10^6 \\ -28.3 \times 10^6 & 20.41 \times 10^6 \end{bmatrix}$$

Damping Coefficients: (lbs-sec./in.)

$$\begin{bmatrix} D_{xx} & D_{xy} \\ D_{yx} & D_{yy} \end{bmatrix} = \begin{bmatrix} 2.85 \times 10^4 & -2.66 \times 10^4 \\ 2.69 \times 10^4 & 1.11 \times 10^5 \end{bmatrix}$$

The magnitude of the off-diagonal terms ($K_{xy}$, $K_{yx}$, $D_{xy}$, $D_{yx}$) evidences the above bearing configuration has very strong cross-coupling. That is, the terms off the diagonal of terms ($K_{xx}$, $K_{yy}$, $D_{xx}$, $D_{yy}$) extending from the upper left to the lower right positions in the matrices have large magnitudes.

In one known configuration, conventional tilting pads are interleaved. There, each single pad cannot independently find its own equilibrium position. Rather, in addition to fluid pressure forces, each pad must respond to two other forces on its leading and trailing edges owing to mechanical contact with adjacent pads. In particular, the pad experiences reaction forces on its ends from touching preceding and consecutive pads. So, the pads do not tilt independently. What a first pad does influences a second pad, and so on. As introduced above, such interdependencies appear mathematically as sizable off-diagonal terms in the stiffness and damping matrices. Furthermore, sizable cross-coupling terms give rise to destabilizing forces in the bearing, undesirably producing the well-known phenomenon of half-speed whirl.

The designing of tilting pads presents many challenges. Common difficulties, whose effects need minimizing, include unloaded pad instability, pad wiping over the pivot, and hot fluid carryover, which are discussed below. Conventional tilting pads exhibit many shortcomings in facing these problems.

For the case of normal steady state rotation of a horizontally-oriented shaft, the pads in a conventional tilting pad bearing assembly situated above a horizontal split of the bearing are unloaded. Here, the unloaded pads tend to oscillate about their pivots. Rocking back and forth causes the leading edge of such a pad to bang the convex surface of the shaft. This phenomenon, commonly known as spragging, can dislodge large sections of babbitt metal from the backing of the conventional tilting pad. Resultant dangers include separation of the babbitt metal along the length of the pad as well as carry of the dislodged babbitt metal into clearance space between the pad and the shaft. This undesirably results in metal contact and excessive heating, which in turn lead to operational failure.

In a conventional tilting pad subject to extremely large loading, forced mechanical engaging occurs between the convex surface of the shaft and the arc of the pad. Of course, this wiping usually occurs on the arc portion trapped directly over the pivot, rather than on the freely tilting ends.

Hot fluid carryover is a classic problem inherent in tilting pad bearings. Many researchers have devised elaborate configurations for diverting fluid flow away from the region between the trailing and leading edges of successive tilting pads. In particular, shearing stress in the fluid because of an upstream pad heats the fluid. This heating of the fluid is a function of the fluid film thickness, which in turn is a function of the separation between the shaft and the pad face. Horsepower loss is inversely proportional to this film thickness.

Hydrodynamic pads have also been used in thrust bearings. An example of a tilting type hydrodynamic pad is disclosed in U.S. Pat. No. 6,089,754 to Wilkes et al., Jul. 18, 2000, which is hereby incorporated herein by reference in its entirety.

Thus, a need exists for a tilting pad for use in journal and/or thrust bearings that minimizes the occurrences of unloaded pad instability and the effects of pad wiping over the pivot as well as hot fluid carryover. A further need exists for a bearing arrangement that increases hydrodynamic support for the convex surface of the shaft and decreases horsepower loss. Still a further need exists for a bearing arrangement that increases hydrodynamic support for a moving surface of a rotating disk or runner and decreases horsepower loss.

SUMMARY OF THE INVENTION

The shortcomings of the prior art are overcome and additional advantages are provided through the provision of a thrust bearing tilting pad which is pivotally supported and adapted to cooperate with one or more other pads and fluid within a housing to hydrodynamically and mechanically support a moving surface of a runner attached to a shaft. The tilting pad includes a leading portion adapted to be positioned upstream relative to a direction of movement of the moving surface, a trailing portion adapted to be positioned downstream relative to the direction of movement of the moving surface, and a face including a border region and extending generally longitudinally between the leading and the trailing portions. The border region includes an engagement surface and a pocket for hydrodynamically increasing pressure on the moving surface during movement of the moving surface. The pocket also has generally longitudinal sidebars and a bottom.

In another aspect of the present invention, a true-tilting pad is provided which is pivotally supported and adapted to cooperate with one or more other pads and fluid within a housing to hydrodynamically and mechanically support a moving surface. The true-tilting pad includes a leading portion adapted to be positioned upstream relative to a direction of movement of the moving surface, and a trailing portion adapted to be positioned downstream relative to the direction of movement of the moving surface. The leading and the trailing portions are tiltable free of mechanical engagement with the other pads. The true-tilting pad also includes a face including a border region and extending generally longitudinally between the leading and the trailing portions. The border region including an engagement surface and defining a pocket for hydrodynamically increasing pressure on the moving surface during movement of the moving surface. The pocket also has generally longitudinal sidebars and a bottom.

In another aspect of the present invention, a combination thrust bearing and journal bearing is provided for supporting a shaft having a runner. The combination includes a thrust bearing for axially supporting the runner in at least one direction, a journal bearing for radially supporting the shaft, and a conduit for distributing fluid directly to both the thrust bearing and the journal bearing.

In another aspect of the present invention, a method is provided for distributing fluid to a thrust bearing and a journal bearing. The method includes providing a pressurized fluid, providing a conduit, and distributing through the conduit a first portion of the pressurized fluid directly to the thrust bearing and second portion of the pressurized fluid directly to the journal bearing.

In still another aspect of the present invention, a method is provided for directed lubrication of a fluid in a bearing. The method includes providing a pad having a longitudinally-extending pocket, introducing fluid into the pocket in a direction substantially parallel to the longitudinally-extending pocket, and discharging fluid from the pocket in a direction substantially parallel to the longitudinally-extending pocket.

Additional features and advantages are realized through the structures and techniques of the present invention. These and other embodiments and aspects of the invention are described in detail herein.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

FIG. 1 depicts one example of a true-tilting pad of the present invention;

FIG. 3 plots a curve of eccentricity versus Sommerfeld number (which increases with decreasing load) for the true-tilting pad of FIG. 1, such a curve for the true-tilting pad of FIG. 6, and such a curve for a conventional tilting pad;

BEST MODE FOR CARRYING OUT THE INVENTION

The invention is directed to various tilting pads for bearings such as journal bearings as discussed below in connection with FIGS. 1–7, 12, 13B, 13C and 16A, thrust bearings as discussed below in connection with FIGS. 8–11, 13A, 14, 15, and 18, and lubricant distribution to journal bearings and thrust bearings as discussed below in connection with FIG. 20.

In accordance with the principles of the present invention, a hydrodynamic and mechanical support capability is provided in which a true-tilting pad of a journal bearing or a thrust bearing tilts free of mechanical engagement with one or more other pads. In a first example, the face defines a pocket with longitudinal sidebars and a bottom. The pocket hydrodynamically increases support for a moving surface such as a shaft for a journal bearing or a runner for a thrust bearing, stabilizes the true-tilting pad, and decreases horsepower loss, as described herein.

An explanatory discussion of exemplary feature(s) for tilting pad(s) is presented herein. As will be appreciated by those skilled in the art, feature(s), characteristic(s), and/or advantage(s) of (e.g., portions of) the pad(s) and/or bearing (s) described herein and/or in the above-incorporated application Ser. No. 09/373,672, and/or U.S. Pat. Nos. 5,772,335, and 6,079,102 may be applied and/or extended to any embodiment (e.g., and/or portion thereof). The entire contents of each of these references is hereby incorporated herein by reference.

Figure 2A:
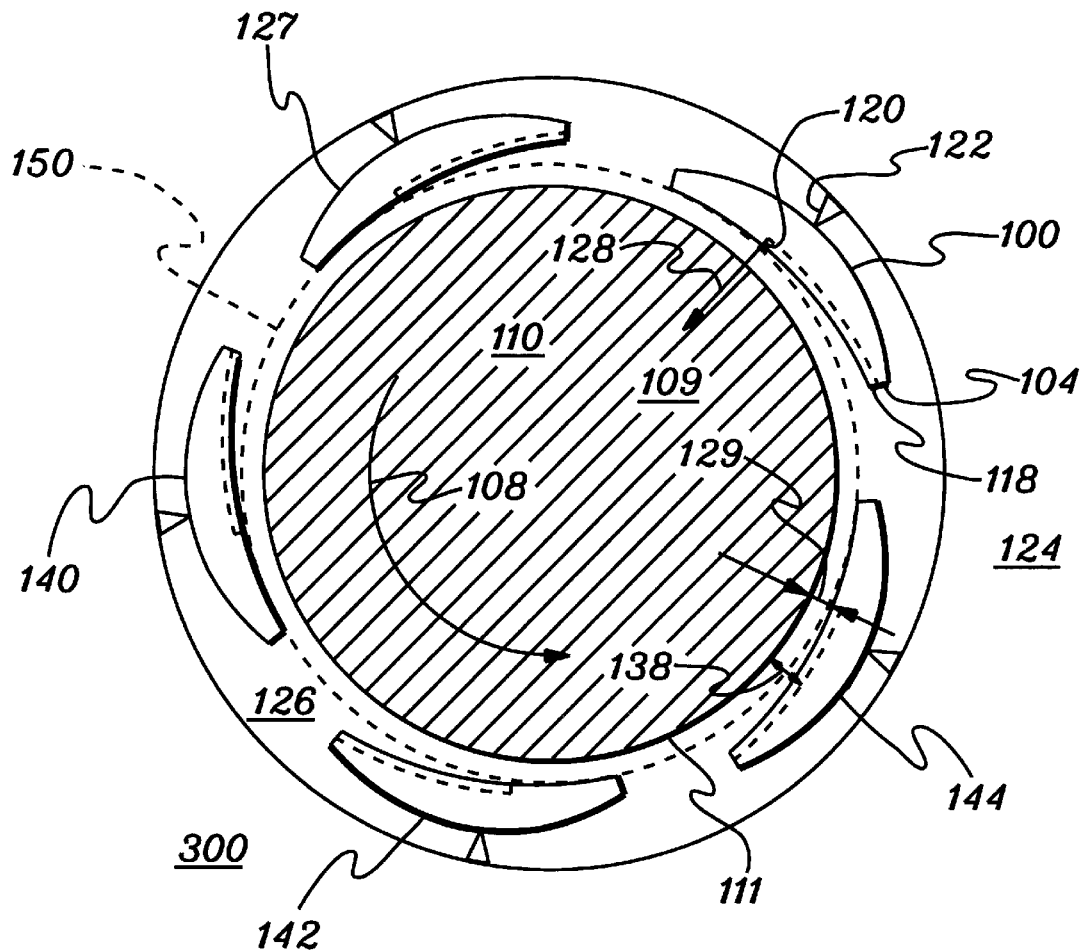
FIG. 2A depicts one example of an overall bearing using the true-tilting pad of FIG. 1, in accordance with the principles of the present invention.

One example of a true-tilting pad incorporating and using the hydrodynamic and mechanical support capability of the present invention is depicted in FIGS. 1 and 2A, and described in detail below.

In this example, true-tilting pad 100 includes a body 101, a face 102, and leading portion 104 as well as trailing portion 106. The true-tilting pad exhibits little or no cross-coupling, as discussed below. As shown in FIG. 2A, the leading portion is positioned upstream relative to rotation direction 108 of journal or shaft 110. Also, the trailing portion is positioned downstream relative to the rotation direction of the shaft. The face 102 extends longitudinally between the leading and trailing portions. The shaft is rotatable by prime mover 109 and includes convex surface 111.

As depicted in FIG. 1, face 102 has border region 112 with engagement surface 114. In the exemplary embodiment depicted, the border region is coextensive with the engagement surface. Also, the border region defines pocket 116 having longitudinal sidebars 121, 123, bottom 119, and abrupt step 120. The angle of the abrupt step with respect to the face 102 is in the range 89 to 115 degrees, and is most preferably in the range 89 to 91 degrees. In one preferred embodiment, the sidebars converge along the rotation direction 108. This convergence reduces bulk proximity between the convex surface 111 and the face at entrance 118, and therefore reduces horsepower loss.

As shown in FIG. 2A, true-tilting pad 100 is pivotally supported by pivot 122. Housing 124 supports the pivot and holds lubricating fluid 126, which can be gaseous or liquid. The true-tilting pad cooperates with one or more other pads 127, which additional pads could be formed in accordance with the present invention or conventionally. The true-tilting pad tilts free of engagement with the other pads. Moreover, the true-tilting pad 100 and the other pads cooperate with each other and the fluid to hydrodynamically and mechanically increase support for shaft 110. In one particular aspect of the present invention, the pocket 116 of true-tilting pad 100 hydrodynamically increases pressure on convex surface 111 during rotation of the shaft.

In the embodiment of the present invention depicted in FIG. 1, leading portion 104 defines entrance 118 of pocket 116. Furthermore, border region 112 defines the pocket laterally interiorly with respect to face 102.

Abrupt step 120 hydrodynamically constricts flow of fluid 126 during the rotation of shaft 110. Entrance 118 and sidebars 121, 123 feed the fluid for flow through pocket 116 and over the abrupt step 120. That is, the abrupt step constitutes an abrupt reduction in area that forces the streamlines of the fluid to dramatically converge. This abrupt restriction builds up a large pressure on the face 102 upstream, relative to the rotation of the shaft, of the abrupt step 120. The abrupt step hydrodynamically enhances the wedge effect. Therefore, the fluid 126 flows relatively faster between the abrupt step 120 and the convex surface 111 than immediately upstream. This yields relatively increased pressure immediately upstream of the abrupt step 120. Accordingly, the pocket 116 hydrodynamically generates additional force on the convex surface 111. In one embodiment, this hydrodynamic force is directed substantially along relative force direction 128, as depicted in FIG. 2A.

Additional exemplary description of pad 100 having pocket 116 with abrupt step 120, is presented further below. The illustrative discussion now turns to an exemplary embodiment of pad 100 having pocket 116 with generally tapered profile 702.

Figure 6:
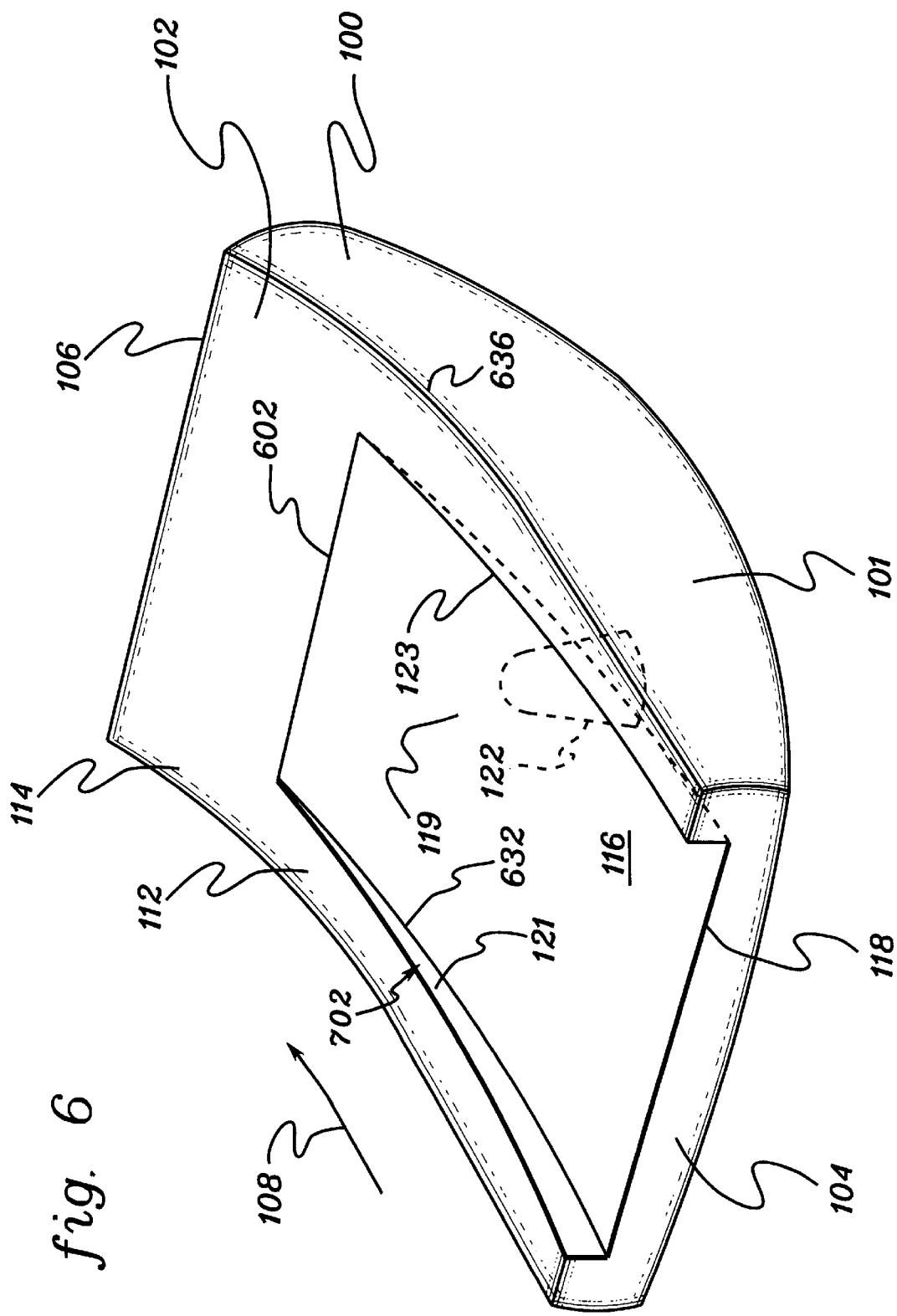
FIG. 6 depicts another example of a true-tilting pad of the present invention, illustrating a face of the pad with a generally tapered pocket.
Figure 7:
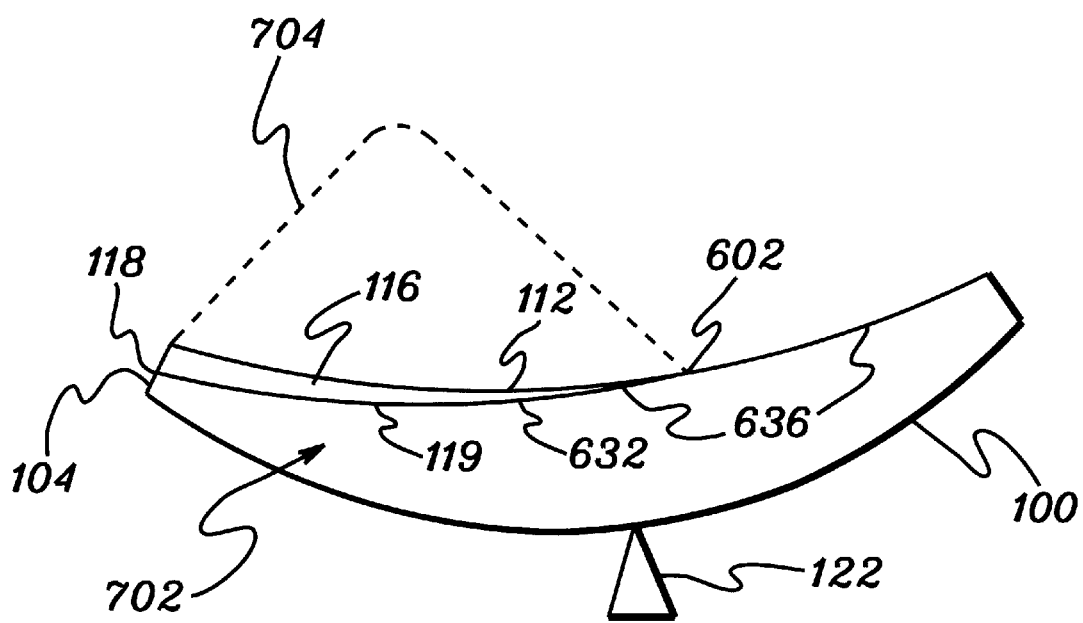
FIG. 7 is a cutaway, sectional, partial, side view of one embodiment of the true-tilting pad of FIG. 6, illustrating an exemplary fluid pressure distribution.

FIGS. 6–7 depict another example of a true-tilting pad incorporating and using the hydrodynamic and mechanical support capability of the present invention.

Referring to FIG. 6, true-tilting pad 100 includes body 101, face 102, and leading portion 104 as well as trailing portion 106. The true-tilting pad exhibits little or no cross-coupling, as discussed herein. The leading portion is positioned upstream relative to exemplary rotation direction 108 of journal or shaft 110 (FIG. 2A). Also, the trailing portion is positioned downstream relative to the rotation direction of the shaft. The face 102 extends generally longitudinally between the leading and trailing portions. In addition, the face is configured to be generally directed toward the shaft. The true-tilting pad is pivotally supported by pivot 122.

Referring to FIGS. 2A and 6, pocket 116 hydrodynamically constricts flow of fluid 126 during the rotation of shaft 110. Entrance 118 and sidebars 121, 123 feed the fluid for flow through pocket 116 and over termination 602.

Again referring to FIG. 6, face 102 has border region 112 with engagement surface 114. In the exemplary embodiment depicted, the border region is coextensive with the engagement surface. Also, the border region defines pocket 116 having generally longitudinal sidebars 121, 123 and a bottom 119. For instance, the sidebars can generally converge along the rotation direction 108, as discussed herein. Leading portion 104 defines entrance 118 of the pocket. In addition, the border region defines the pocket laterally interiorly with respect to the face.

Referring to FIGS. 6–7, bottom 119 of pocket 116, in one example, includes entrance (e.g., a first location) 118 and termination (e.g., a second location) 602 of the pocket. Relative to rotation direction 108, in one embodiment, the entrance comprises a port and/or channel for entry of fluid 126 (FIG. 2A) into the pocket, and the termination comprises a port and/or channel for exit of the fluid from the pocket. For instance, the bottom slopes and/or curves (e.g., gradually and/or continuously) from the entrance to the termination, to form a (e.g., tapered, gradually diminishing, sloped, and/or curved) profile 702 for the pocket. The termination 602 meets, connects, joins, and/or merges with the border region 112 and/or engagement surface 114.

Still referring to FIGS. 6–7, pocket 116 can taper from a (e.g., maximal) depth at leading portion 104 of pad 100, to (e.g., nearly or substantially) zero depth when meeting border region 112 and/or engagement surface 114 of the pad. The depth of entrance 108, in one example and relative to border region 112, is in the approximate range of 50 $\mu$m (0.002 in.) to 153 $\mu$m (0.006 in.).

Referring to FIG. 7, one embodiment of pad 100 comprises overall arc 636 and pocket arc (e.g., sub-arc) 632 having a substantially same magnitude of radius. In addition, the overall arc 636 and the sub-arc 632 have different orientations. Pocket arc 632 is oriented slightly upstream along rotation direction 108 relative to the orientation of overall arc 636, which is aligned radially with shaft 110 (FIG. 2A). In one example, the pocket arc 632 corresponds to pocket arc length 132 (FIG. 1), and the overall arc 636 corresponds to pad arc length 136 (FIG. 1). The sub-arc 632, as an inset or sub-feature of the overall arc 636, provides profile 702 for the pocket 116.

Pocket 116 can advantageously provide efficiencies, savings, and manufacturing ease in forming the pad.

For illustrative purposes, an exemplary formation of true-tilting pad 100 with a tapered pocket 116, is now presented. As will be understood by those skilled in art, a workpiece to be formed into the pad 100 can be placed on a machine having a rotating cutter (not shown). Referring to FIGS. 6–7, overall arc 636 can be cut, machined, shaped, and/or formed in face 102 of the pad after centering and locating the cutter at a particular magnitude of radius with respect to the workpiece. Pocket arc 632 can be cut, machined, shaped, and/or formed in the face of the pad by employing substantially the same particular magnitude of radius after moving (e.g., swinging) the cutter upstream (e.g., 101 $\mu$m, 0.004 in.) relative to the rotation direction 108, and (e.g., 25 $\mu$m, 0.001 in.) toward the pad.

As will be appreciated by those skilled in the art, a computer program can be used to calculate the movements of the cutter. For instance, a particular overall arc 636, a certain entrance 118, and a certain pocket arc 632 can be provided, by determining and/or specifying coordinates for movement of the cutting head. In one example, a computer (not shown) can read the (e.g., two) coordinates and cause the tapered pocket 116 to be machined into face 102 of the pad 100. The same setup and the same tool used to machine the overall arc 636 of the pad, through specification of additional coordinates, can be used to machine the sub-arc 632.

The tapered pocket 116 enhances the wedge effect by providing an additional convergence. In one example, the cross-sectional area of the pocket of the pad is continuously decreased relative to rotation direction 108 and along overall arc 636 of the pad to hydrodynamically build up pressure. For instance, a generally uniform reduction in the cross-sectional area of the pocket from entrance 118 to termination 602 of the pocket, provides a pressure profile having a substantially uniform and parabolic distribution 704 (FIG. 7) from the entrance to the termination of the pocket. In one example, a relatively gradual, continuous pressure profile for the distribution 704 can promote decreased consumption or expenditure of energy, so horsepower losses are restrained or lowered. For instance, with a lower rate of change of pressure, viscosity can be reduced. By restraining or reducing viscosity, horsepower losses can be decreased. By smoothing and/or decreasing the slope of the pressure gradients (i.e., the derivative of the distribution 704), the tapered pocket can decrease the effect of viscosity and cause bearing 300 (FIG. 2A, described herein) to use less energy. That is, the effect of viscosity can be restrained or decreased with a restraint, smoothing, and/or decrease in the rate of change of the pressure in fluid 126 (FIG. 2A). So, the tapered pocket can achieve a substantial increase in load-bearing capacity over the conventional pad (see description herein of FIG. 3), while causing relatively low energy losses and providing one or more advantages described herein.

From entrance 118 (FIGS. 6–7), pocket 116 in pad 100 is reduced in depth to form a tapered or converging profile 702 for body 101 of the pad. There is a continuously decreasing depth of the pocket along rotation direction 108 of shaft 110 (FIG. 2A). Termination 602 (e.g., as a point of engagement) can provide a merging of sub-arc 632 with overall arc 636. Therefore, the fluid flowing in the tapered pocket 116 does not have to significantly change direction. The fluid from the pocket actually merges with the working fluid (e.g., approximately tangentially), which advantageously results in minimal energy loss.

The description continues to illustrate exemplary features for a number of embodiments of pad 100, as will be appreciated by those skilled in the art.

Referring generally to FIGS. 2A and 7, rotation of shaft 110 in the presence of fluid 126 naturally develops a spragging force about pivot 122. In particular, the rotation causes engagement between the shaft and face 102. This spragging force is directed downstream relative to rotation direction 108 of the shaft. Advantageously, pocket 116 generates pressure in the fluid that effects on face 102 a counteraction force about the pivot and upstream relative to the rotation direction. This counteraction force of the present invention desirably counteracts the spragging force. So, the pocket 116 hydrodynamically produces a load that stabilizes true-tilting pad 100. In producing the counteraction force, the present invention advantageously discourages development of a couple moment about the pivot. Accordingly, the present invention decreases oscillation tendencies of the true-tilting pad about the pivot. This prevents spragging as well as babbitt metal failure.

Engagement surface 114, in one embodiment, is shaped concavely for substantially radial alignment with the convex surface of the shaft. Furthermore, in a preferred embodiment, pocket 116 longitudinally extends over pivot 122 and thereby increases radial clearance of the convex surface. So, the engagement surface 114 does not extend over pocket 116. Therefore, the decreased surface area of the engagement surface 114 exposed for mechanical engaging with the convex surface 111, of the shaft 110, advantageously translates into decreased friction during mechanical engaging with the shaft. Namely, the convex surface only wipes the engagement surface 114.

By reducing bulk proximity, one also decreases shearing stress and temperature rise in fluid 126 located between the convex surface and face 102. Moreover, as discussed further below, one could vary performance characteristics of true-tilting pad 100 to halve the shearing stress and thereby halve the horsepower loss.

With a typical inlet temperature of fluid 126 at about 120 degrees Fahrenheit, the conventional tilting pad usually yields a discharge fluid temperature of about 170 degrees Fahrenheit. As outlined below, one could vary the performance characteristics to yield instead a discharge fluid temperature of about 145 degrees Fahrenheit, following the same 120 degrees Fahrenheit input fluid temperature. Alternatively, the true-tilting pad could begin rather with an inlet fluid temperature of about 145 degrees to yield the same 170 degrees Fahrenheit discharge fluid temperature. This desirably allows use of a less viscous lubricant as the fluid and accordingly reduces horsepower loss. Therefore, the true-tilting pad advantageously addresses the root cause of hot fluid carryover by decreasing the increase in temperature of the fluid carried over.

By reducing thermal gradients throughout the fluid, the true-tilting pad 100 with abruptly-stepped pocket 116 lessens stresses in the pad itself. Many additional benefits also result from the decrease in fluid temperature increase. For example, in known constructions of tilting pads, the present invention advantageously lessens stresses at the interface bond of the steel backing with the babbitt metal. Also, the present inventions minimizes silver removal, so different known mixtures of oil and additives can be used with various combinations of metals and alloys.

With similar effect(s), the true tilting pad 100 having the tapered pocket 116 also lessens stresses in the pad itself, by reducing thermal gradients throughout the fluid.

Detailed three-dimensional finite element analysis shows true-tilting pad 100 can support the same load on shaft 110 as the conventional tilting pad, while consuming only forty-five percent as much horsepower. The performance characteristics resulting from abrupt step 120 depend on parameters such as abrupt step clearance 129, abrupt step height 131, abrupt step width 130, abrupt step arc length 132, pad width 134, pad arc length 136, and pivot clearance 138, as shown in FIGS. 1 and 2A. In particular, the abrupt step clearance is the local fluid thickness as measured from the convex surface 111 to the face 102. Furthermore, the pivot clearance is measured from the convex surface to bottom 119 of the pocket 116. Desirably, one can develop a wide range of performance characteristics for the true-tilting pad by varying and tuning these parameters.

Similar performance characteristics can be obtained with true-tilting pad 100 having tapered pocket 116, depending on parameters such as pocket width 130, pocket arc length 132, pad width 134, and pad arc length 136.

In accordance with one preferred embodiment of the present invention, true-tilting pad 100 has the following characteristics. The ratio of abrupt step clearance 129 to pivot clearance 138 is in the range 1.25 to 10.00, and is most preferably in the range 1.80 to 2.20. Also, the ratio of abrupt step arc length 132 to pad arc length 136 is in the range 0.40 to 0.85, and is most preferably in the range 0.42 to 0.75. Additionally, the ratio of abrupt step width 130 to pad width 134 is in the range 0.10 to 0.95, and is most preferably in the range 0.30 to 0.90. Moreover, pivot 122 is preferably positioned longitudinally from leading edge 104 approximately sixty percent along the pad arc length 136. Further, the pivot is positioned transversely symmetrically with respect to the pad width. These optimizations enhance the converging wedge in fluid 126 between face 102 and convex surface 111. This, in turn, reduces the horsepower loss.

Referring to FIGS. 1–2A and 6–7, one analogous example of true-tilting pad 100 with tapered pocket 116 has the following characteristics, which can produce comparable benefit(s). The ratio of pocket arc length 132 to pad arc length 136 is in the range 0.40 to 0.85, and is most preferably in the range 0.42 to 0.75. Additionally, the ratio of pocket width 130 to pad width 134 is in the range 0.10 to 0.95, and is most preferably in the range 0.30 to 0.90. Moreover, pivot 122 is preferably positioned generally longitudinally from leading edge 104 approximately sixty percent along the pad arc length 136. Further, the pivot is positioned generally transversely symmetrically with respect to the pad width.

FIG. 2A shows an exemplary embodiment of overall journal bearing 300 formed through selective positioning of five pads 100, 127, 140, 142, 144. In one preferred embodiment, the pads are true-tilting pads configured in accordance with the present invention. The pads cooperate with each other and fluid 126 to hydrodynamically increase pressures on convex surface 111. One can tune the parameters of the pads to use these pressures for hydrodynamically squeezing the convex surface during the rotation. Further, the pads hydrodynamically generate increased force on the convex surface. Preferably, the overall bearing has a substantially circular shape with a center. These pressures advantageously can hydrodynamically load shaft 110 at the center of the substantially circular shape of the overall bearing, during the rotation.

Figure 2B:
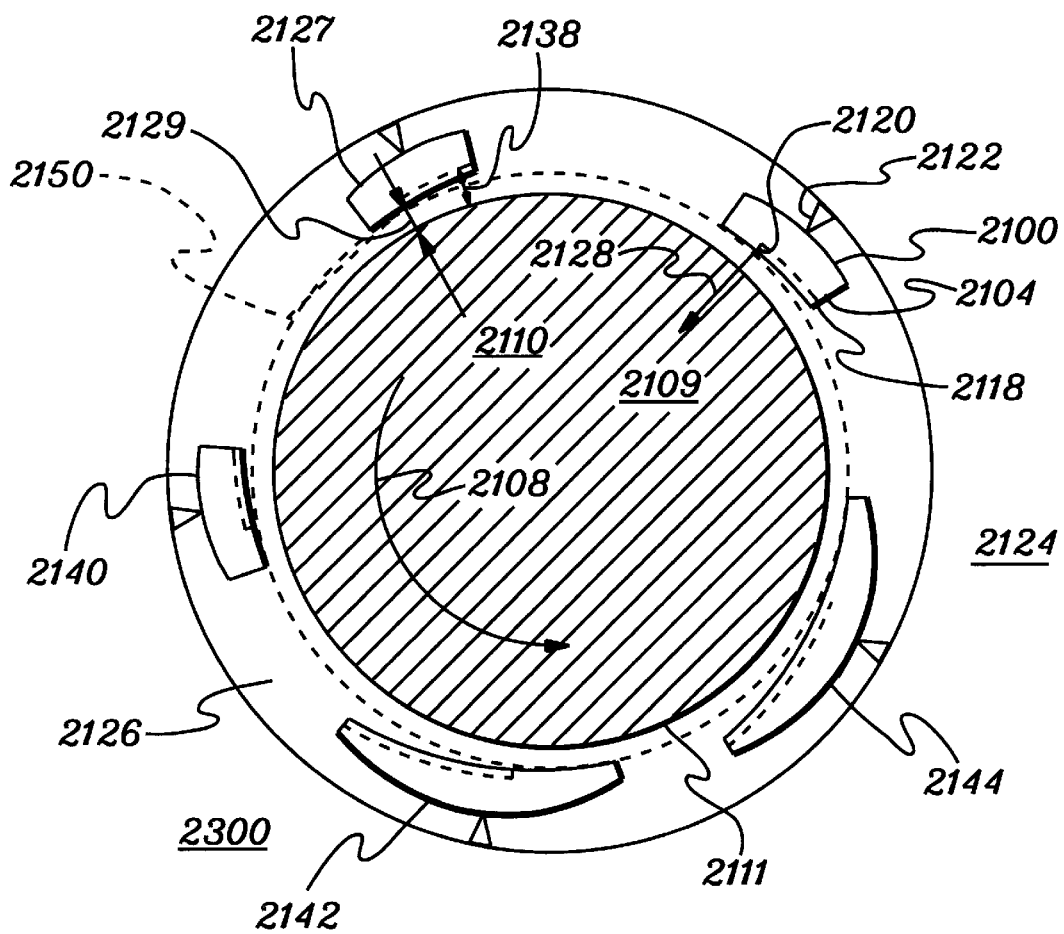
FIG. 2B depicts another example of an overall bearing using the true-tilting pad of FIG. 1, in accordance with the principles of the present invention.

FIG. 2B illustrates an alternative embodiment of a journal bearing 2300 having three tilting pads 2140, 2127, 2100, each having pockets, and two conventional pads 2142 and 2144. As described above, one can tune the parameters of the pads to use these pressures for hydrodynamically squeezing the convex surface during the rotation. These pressures advantageously can hydrodynamically load shaft 2110 and force it towards the oversized conventional pads 2142 and 2144 to dramatically increase the damping in the bearing.

Moreover, the present invention also addresses the problem of shaft 110 tending to orbit elliptically during the rotation. In particular, the hydrodynamic pressures contributed by pads 100, 127, 140, 142, 144 can reduce, and size similarly, the major and minor axes of the ellipse. This shifts the tendency of the shaft toward rotating in a more-centered and less-elliptical orbit.

In the case of shaft 110 having horizontal axis orientation, one could select pads 100, 127, 140, 142, 144 to be true-tilting pads and tune them as follows. In order to reduce horsepower loss, one could select arc length 136 of upper tilting pads 100, 127 to be half that of bottom tilting pad 142. Furthermore, one could reduce the pad width 134 of the upper tilting pads relative to that of the bottom tilting pad. Additionally, one could slightly reduce the arc length of side tilting pads 140, 144, relative to the arc length of the bottom tilting pad. As described above, hydrodynamic loading stabilizes the upper pads against spragging. Also, the side pads 140, 144 hydrodynamically squeeze the shaft to a more symmetrical and circular orbit. Further, the large hydrodynamic lift decreases load on the bottom pad. Decreased eccentricity and decreased horsepower loss result. Mathematically, the off-diagonal terms are zero, or nearly zero, in the stiffness and damping matrices, as represented below, for overall bearing 300.

Spring Coefficients: (lb/in)

$$\begin{bmatrix} K_{xx} & K_{xy} \\ K_{yx} & K_{yy} \end{bmatrix} = \begin{bmatrix} 1.0 \times 10^6 & 0 \\ 0 & 4.0 \times 10^6 \end{bmatrix}$$

Damping Coefficients: (lb-sec/in)

$$\begin{bmatrix} D_{xx} & D_{xy} \\ D_{yx} & D_{yy} \end{bmatrix} = \begin{bmatrix} 2,350 & 0 \\ 0 & 2,680 \end{bmatrix}$$

Therefore, there is little or no cross-coupling.

So, true-tilting pad 100, truly tilting because it exhibits little or no cross-coupling, suits use in all high performance turbo-equipment. Conversely, using the conventional interleaved tilting pads arrangement, and thereby introducing leading and trailing forces that make the off-diagonal terms large, compromises performance and results in instability.

For a given less than very-heavy load, a given speed, and a given geometry, entrance 118, sidebars 121, 123, bottom 119, and abrupt step 120 of pocket 116 produce a hydrodynamic force far in excess of the conventional tilting pad. In FIG. 3, a Sommerfeld number less than 0.1 represents a very-heavy load. Moreover, eccentricity increases along the vertical axis; but, load decreases along the horizontal axis and so increasing Sommerfeld numbers represent a decreasing load.

FIG. 3 depicts plots of eccentricity versus load for a conventional tilting pad, curve 146, and the true-tilting pad of the present invention, curve 148. For purposes of illustration, curve 148 corresponds to a true-tilting pad 100 formed with exemplary parameter values, which by no means represent the absolute limit of performance for other embodiments of the present invention formed having other parameter values.

Still referring to FIG. 3, curve 302 depicts an exemplary plot of eccentricity versus load for the true-tilting pad having the tapered pocket of the present invention. For a given less than very-heavy load, a given speed, and a given geometry, entrance 118, sidebars 121, 123, bottom 119, and termination 602 of pocket 116 produce a hydrodynamic force far in excess of the conventional tilting pad.

As illustrated in FIG. 3, true-tilting pad 100 of the present invention produces a much larger restoring force, and accordingly could support more load up to heavy loads, than the conventional tilting pad. Also, for a given less than very-heavy load, the true-tilting pad of the present invention yields much less eccentricity than the conventional tilting pad. Moreover, on this plot, all solutions for the conventional tilting pad lie along curve 146. Conversely, below intersection 149 of curves 146, 148, curve 148 only represents a limit of performance for this particular embodiment of the present invention formed with exemplary parameter values. Further, the intersection 149 represents a limitation of performance of this embodiment of true-tilting pad 100 only when bearing very-heavy loads.

Similarly, below intersection 304 of curves 146 and 302, curve 302 only represents a limit of performance for a certain embodiment of the pad having the tapered pocket formed with exemplary parameter values. Further, the intersection 304 represents a limitation of performance of the embodiment of true-tilting pad 100 having the tapered pocket 116 only when bearing very-heavy loads.

That is, true-tilting pad 100 provides increased tunability for overall bearing 300. Tuning of parameters 129, 130, 132, 134, 136, 138 for influencing the fluid wedge, as well as of the positioning of pads 100, 127, 140, 142, 144, allows one to employ superior lift to suit many possible needs, uses, and environments. In accordance with the present invention, one can tune the parameters and positioning to suit any desired characteristics bounded by curves 146, 148 below their intersection 149. Namely, any solution below this intersection and between the bounds of the conventional pad and the limit for this exemplary embodiment of the true-tilting pad of the present invention represents a valid solution, in accordance with the present invention. Therefore, the true-tilting pad presents many more design parameters, heretofore unavailable, for working to meet specifications in multiple applications of the present invention.

With similar advantage(s), one can tune a number of the parameters and the positioning to suit any desired characteristics bounded by curves 146, 302 below their intersection 304.

Numerous embodiments in accordance with the present invention work well for either horizontal or vertical axis orientation of shaft 110. Still, in accordance with the present invention, one can optimally tune the parameters and positioning to suit any particular axis orientation of the shaft. For instance, in a case of horizontal orientation of the axis of the shaft, curve 148 shows negative eccentricity for some light loads, meaning one could tune the parameters and positioning to hydrodynamically force the center of the shaft vertically above the center of overall bearing 300. In particular, FIG. 3 represents a light load by a Sommerfeld number greater than one.

As an analogous example with like benefit(s), in a case of horizontal orientation of the axis of the shaft, curve 304, similarly to curve 148, shows negative eccentricity for some light loads.

As discussed above, the enhanced hydrodynamic force results from additional hydrodynamic pressure on convex surface 111 provided by pocket 116 on face 102 of true-tilting pad 100. The squeezing aspect of this enhanced hydrodynamic force can be represented mathematically by an increase in magnitude of a transverse component of the force vector corresponding to the lift. In the case of vertical orientation of the shaft, one can give equivalent treatment to the components of the force vector.

But, in the case of horizontal orientation of the shaft, one must treat the components of the force vector dissimilarly. Namely, one typically aligns one component vertically, to be collinear with the influence of gravity. In one embodiment, one can direct the enhancement capability of the present invention toward greatly increasing the remaining, horizontal component. Hydrodynamically, this tremendous increase in the horizontal component contributes a large vertical lift, to combat the deleterious effects on shaft 110 of the pull of gravity downward from the center of overall bearing 300. Nevertheless, the hydrodynamic lift enhancement also directly increases the vertical component of the force vector.

True-tilting pad 100 of the present invention advantageously works toward centering shaft 110 in clearance space 150 of overall bearing 300, as depicted in FIG. 2A. Therefore, pocket 116 serves to increase the efficiency of machinery. For example, in a turbine embodiment of the invention, centering the shaft in the overall bearing advantageously would center the impeller in its annulus. During rotation of the shaft, pocket 116 desirably minimizes the eccentricity of the shaft position and the ellipticity of its orbit, in accordance with the present invention.

Figure 4:
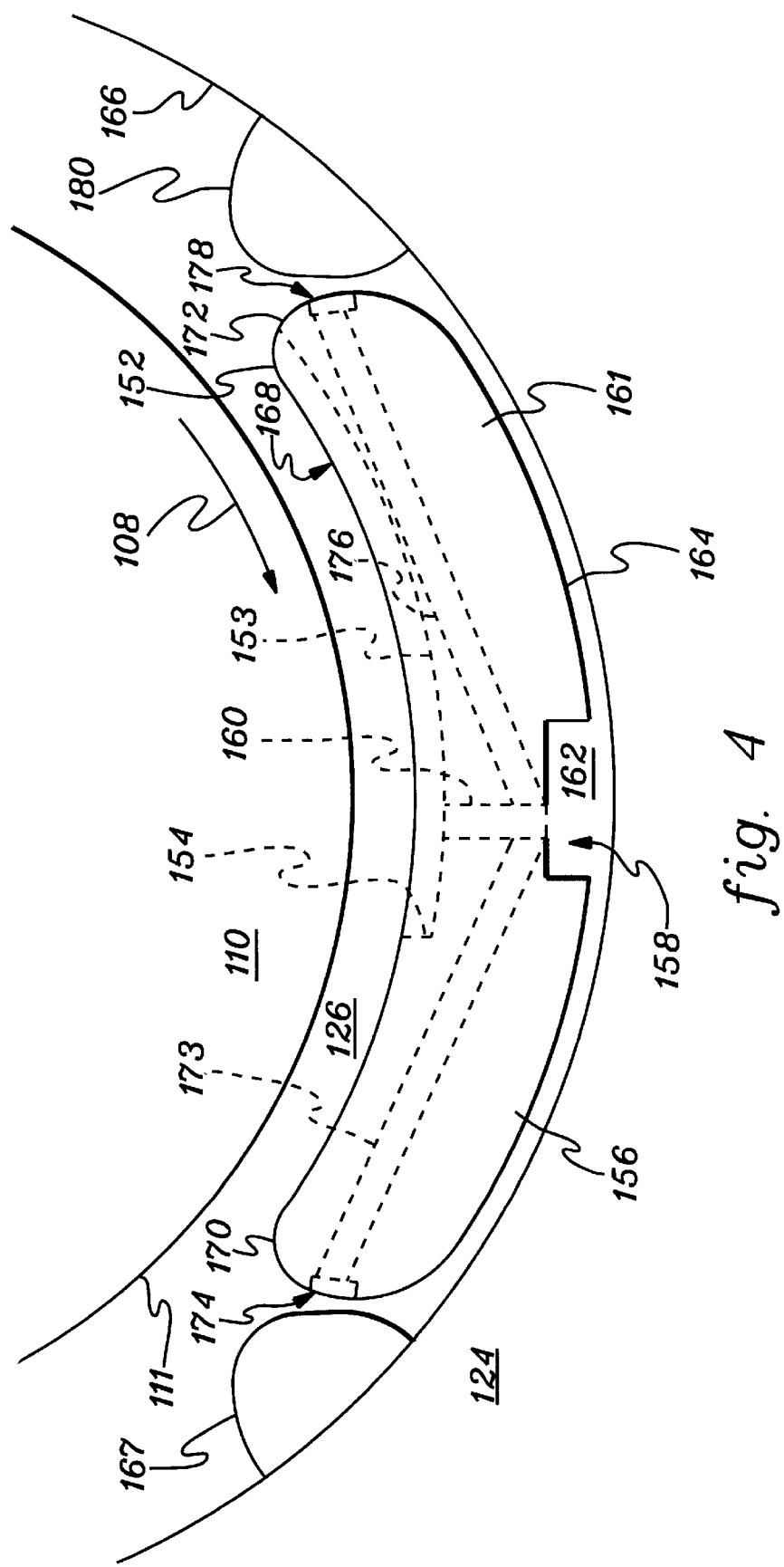
FIG. 4 depicts one embodiment of the true-tilting pad of FIG. 1 suitable for use with a hydrostatic pivot, in accordance with the principles of the present invention.

In another embodiment in accordance with the present invention, entrance 152, bottom 153, and abrupt step 154 of pocket 168 of true-tilting pad 156 improve performance of a hydrostatic pivot 158, as illustrated in FIG. 4. The hydrostatic pivot includes feedhole 160, in the pocket 168 of the face and body 161 of the pad, for feeding fluid 126 down to cavity 162 on backside 164 of the true-tilting pad. This works to float the true-tilting pad over inner surface 166 of housing 124. In one embodiment, the hydrostatic pivot can operate with trailing and leading cam pivots 167, 180 stationary on the housing, for engagement with cooperatively formed trailing and leading ends 170, 172, respectively, of the pad. The trailing and leading cam pivots 167, 180 accordingly guide proper tilt of the true-tilting pad with respect to convex surface 111 of shaft 110. Hydrostatic support in the present invention with respect to trailing and leading cam pivots 167, 180 is discussed further below.

As can be appreciated through examination of FIGS. 4 and 6–7, entrance 118, bottom 119, and termination 602 of generally tapered pocket 116, can comprise pocket 168 of a further embodiment of true-tilting pad 156, to improve performance of hydrostatic pivot 158. For instance, this embodiment includes feedhole 160 in the pocket 116, 168, for feeding fluid 126 to cavity 162 on backside 164 of the true-tilting pad.

The higher pressures, thoroughly discussed above, produced by pocket 168 can also increase pressure on fluid 126 about feedhole 160 of the hydrostatic pivot, thereby improving the floating performance of hydrostatic pivot 158 as well. In particular, a conduit formed from the pocket 168, the feedhole 160, and the cavity 162 permits communication of the fluid. So, one can tune parameters 129, 130, 132, 134, 136, 138 to further produce high pressure on the fluid in the conduit. This advantageously increases the hydrostatic pressure on the true-tilting pad 156 in a direction away from inner surface 166 of housing 124.

In the particular embodiment depicted in FIG. 4, body 161 and trailing portion 170 define passageway 173 and cavity 174 for hydrostatic support of the trailing portion 170 in a direction away from the trailing cam pivot 167. In accordance with the present invention, the passageway 173 and the cavity 174 are in fluid communication with the feedhole 160. Therefore, the increased hydrostatic pressure in the feedhole 160, according to the present invention, advantageously increases hydrostatic pressure on the trailing portion 170 with respect to trailing cam pivot 167. In addition, body 161 and leading portion 172 can define passageway 176 and cavity 178, in fluid communication with the feedhole 160, for hydrostatic support of the leading portion 172 with respect to leading cam pivot 180. Furthermore, one can tune parameters 129, 130, 132, 134, 136, 138 to produce desired pressures on the fluid in these passageways 173, 176 and respective cavities 174, 178 for hydrostatic support of the trailing and leading portions 170, 172.

Similar feature(s) can be provided for an embodiment of true-tilting pad 156 having the generally tapered pocket, with analogous benefit(s).

Figure 5:
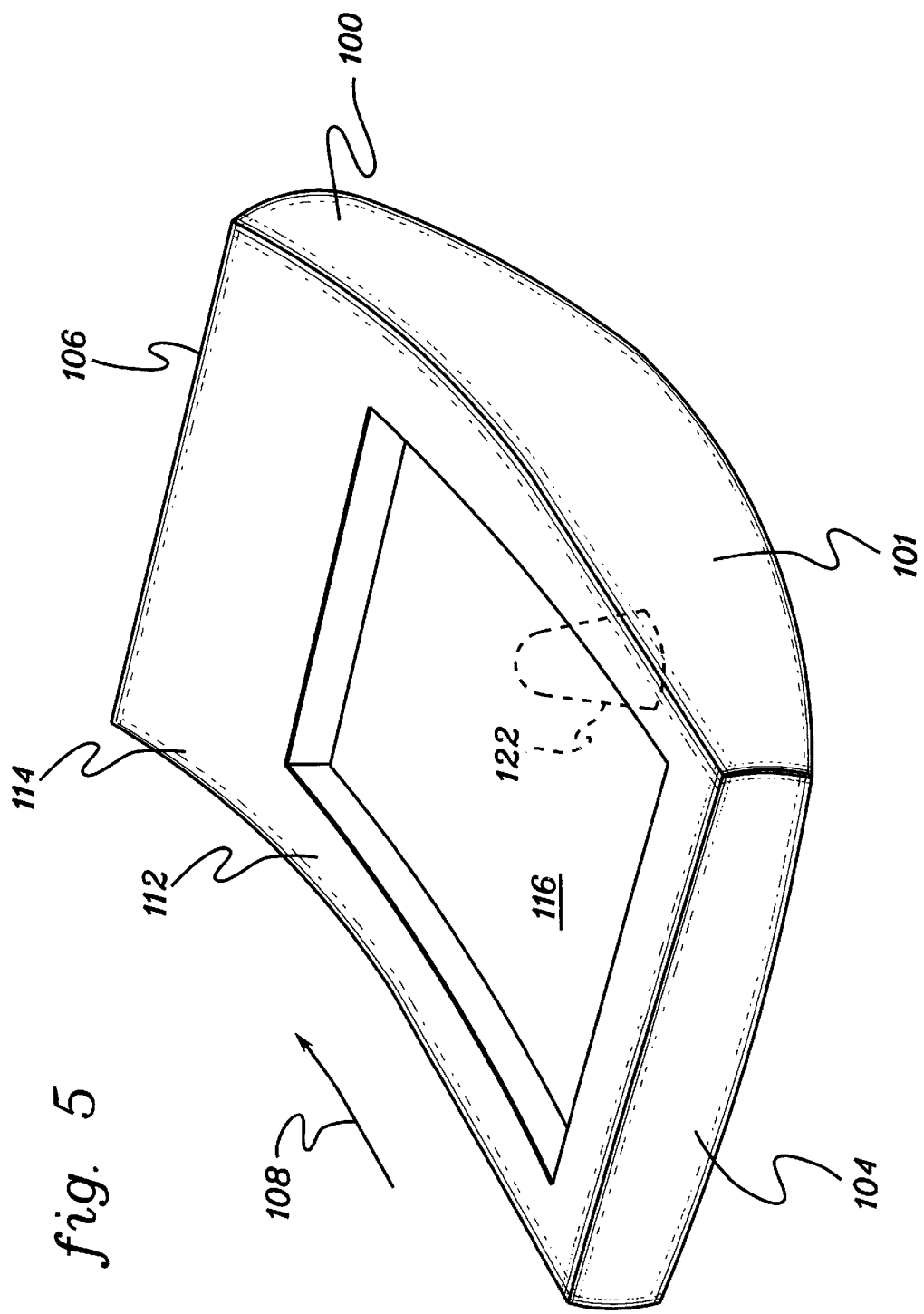
FIG. 5 depicts one embodiment of the true-tilting pad of FIG. 1 where the leading portion does not define an entrance to the pocket, in accordance with the principles of the present invention.

In the embodiment of the present invention depicted in FIG. 5, leading portion 104 does not define an entrance to pocket 116. As can be understood through examination of FIGS. 5–6, the true-tilting pad with the generally tapered pocket, could have entrance 118 located rearward of the leading portion 104.

Numerous alternative variations exist for practicing the present invention. One could easily vary the number and arrangement of pads. For instance, one could easily form overall bearing 300 using instead a conventional pad along with two true-tilting pads configured in accordance with the present invention. Of course, border region 112 need not be coextensive with engagement surface 114. Further, engagement surface 114 could be rippled, dimpled, or diamonded and need not otherwise be continuous. Longitudinal sidebars 121, 123 can easily be aligned in parallel or have various oblique alignments. Naturally, entrance 118 to pocket 116 could be defined forward of leading region 104, such as by gradations on face 102. In the event hydrostatic pivot 158 uses a feedhole bypassing pocket 168, one can further define the pocket to include a passageway to the feedhole. Then, the passageway and the feedhole together form the conduit between the pocket and cavity 162. In another example, termination 602 can end, stop, and/or terminate at a wall such as (e.g., a partial) step 120, which, in turn, can connect with and/or lead to border region 112.

Figure 21:
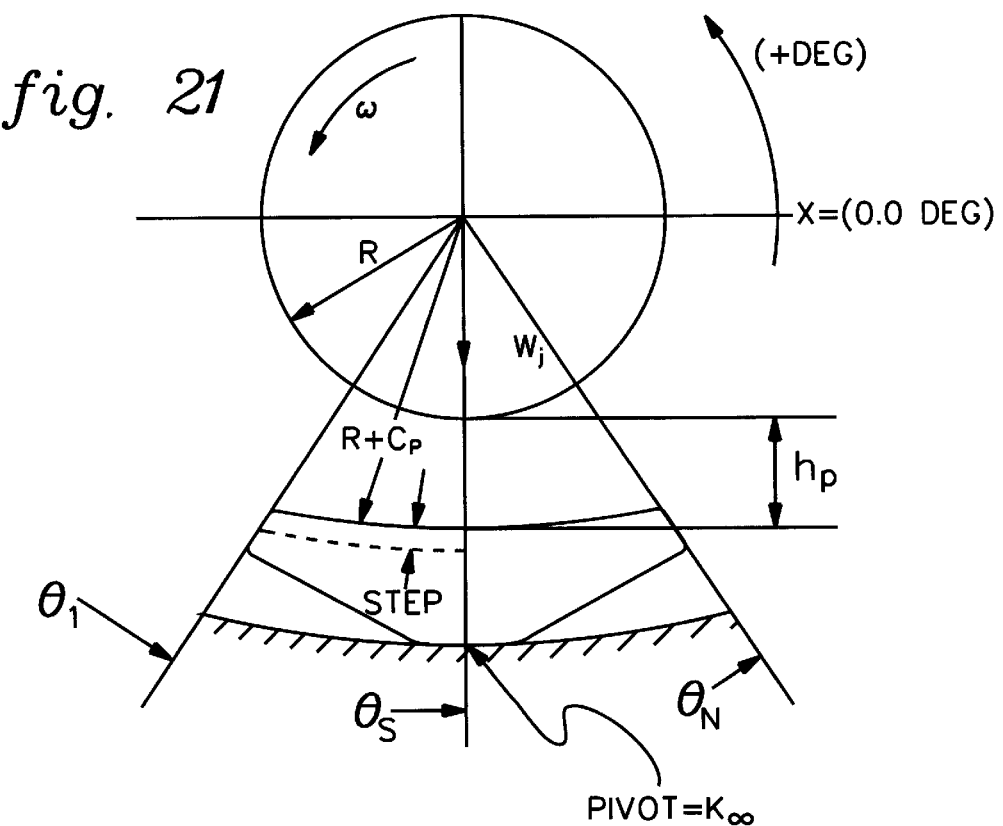
FIG. 21 is a schematic illustration of a tilting pad for use in analyzing performance properties.

FIG. 21 is a schematic illustration of a mathematical model for use in analyzing a single tilt pad in order to calculate its performance properties. In this mathematical model:

ω=Radians/second
$W_j$=Load (Lbs)
$θ_l$=Leading Edge of Pad (Degrees)
$θ_S$=Location of Step (Degrees)
$θ_N$=Trailing Edge of Pad (Degrees)
$h_p$=Film Thickness (over pivot)
$C_p$=Pad Machined Radial Clearance (inches)
STEP=Step Height (constant) (inches)

The pivot is taken as infinitely stiff and the pads thermal and structural deflections are ignored.

Figure 22:
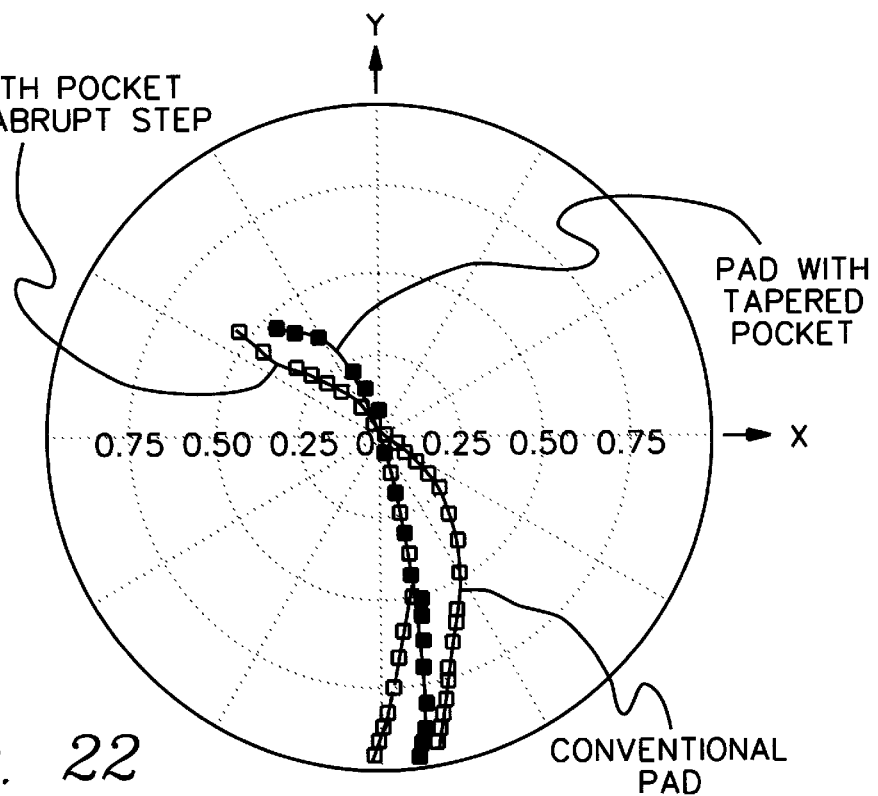
FIG. 22 summarizes and presents the results of load calculations for conventional tilting pads, tilting pads having a tapered pocket, and a tilting pad having an abrupt step.
Figure 23:
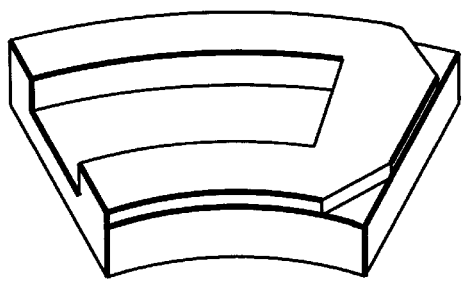
FIG. 23 depicts another example of a thrust bearing tilting pad in accordance with the present invention, illustrating a face of the pad with recessed corner portions.
Figure 24:
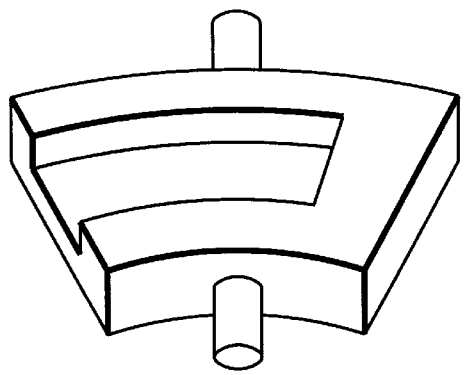
FIG. 24 depicts another example of a thrust bearing tilting pad in accordance with the present invention, illustrating the pad having laterally extending pins.
Figure 25:
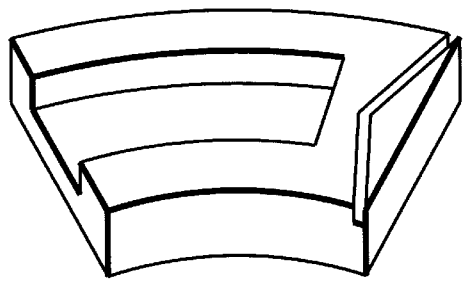
FIG. 25 depicts another example of a thrust bearing tilting pad in accordance with the present invention, illustrating a face of the pad having a V-shaped groove.
Figure 26:
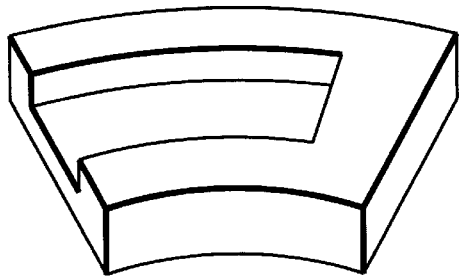
FIG. 26 depicts another example of a thrust bearing tilting pad in accordance with the present invention, illustrating the pad having a converging sidebars.

FIG. 22 illustrates the locus of twenty different load calculations for a conventional tilting pad (without a pocket) which cover the range of eccentricity from e=0 centered in the clearance space to e=0.9 heavily loaded and almost touching the pad at the bottom center.

In addition, FIG. 22 illustrates the locus of the same twenty different load calculations for a tilting pad having a tapered pocket. As illustrated, valid solutions are obtained above the horizontal axis for this configuration of the tilting pad. This important result is due to the increased load carrying capacity of the tilting pad with the tapered pocket.

FIG. 22 also illustrates the locus of the same twenty different load calculations for a tilting pad having a pocket with an abrupt step. Again, valid solutions are obtained above the horizontal axis. This important result is due to the increased load carrying capacity of the tilt pad with an embedded step pocket. One should note that the stepped pocket gives an even greater range of eccentricity above the horizontal axis owing to its even greater load carrying capacity as compared to the tilting pad with an embedded tapered pocket. This ability to achieve load carrying capacity at an eccentricity greater than 1.0 can be used to stabilize the upper pads in a tilt pad bearing which at a steady state often are operating at or near a dimensionless film thickness of 1.0.

In addition, in many designs, a "preload" will be introduced, e.g., the practice of assembling a bearing with clearances less than those used to machine the tilting pad during manufacturing. Preload has been successful in loading the upper pads of a tilting pad bearing but it usually increases the horsepower loss significantly and reduces the bearing damping while increasing the bearing stiffness. Bearing designers have worked to optimize bearing applications while faced with these performance limitations.

Conventional tilting pads (without an embedded pocket) produces a load carrying capacity in response to the proximity of the shaft. If the shaft is further away than 1.0 dimensionless film thickness, then the tilting pad carries no load, and contributes no stiffness or damping to the bearing, but does contribute to the horsepower loss of the bearing.

Tilting pads with an embedded pocket overcome these difficulties in a unique way. By stark contrast, the tilting pad with an embedded pocket develops an "active load" which is in response to the rotation of the shaft and the action of the rapidly reducing profile in the face of the pocket in the tilting pad. And since the tilting pad with an embedded pocket can produce an active load without the application of a load, it can self stabilize the tilting pad.

Hence, the need for preload is virtually eliminated. The horsepower loss is greatly reduced, the sensitivity of the bearing performance to manufacturing tolerances is minimized, and the bearing designer has several additional design variables which can be adjusted to achieve the optimum rotor bearing system performance. These variables are the pocket depth, the pocket width, the pocket arc length. In addition, since the tilting pad with an embedded pocket has a much greater load carrying capacity as compared to the conventional tilting pad, the tilting pad with an embedded pocket can be made shorter in arc length and shorter in axial length without any reduction in load capacity or safety margin as compared to conventional tilting pads.

This allows tailoring the design of bearings using different tilting pads based on the location of the tilting pad with respect to the load. With reference again to FIG. 2A, for example, the top or upper tilting pads usually containing a large embedded pocket may be made shorter and smaller to reduce horsepower loss. The bottom or load carrying tilting pads may be made longer in arc length which greatly increases their damping and film thickness and reduces the eccentricity at which they operate. These factors combine to reduce the horsepower loss of the tilting pad with an embedded pocket, increase its operating film thickness and reduce its operating eccentricity.

Figure 8:
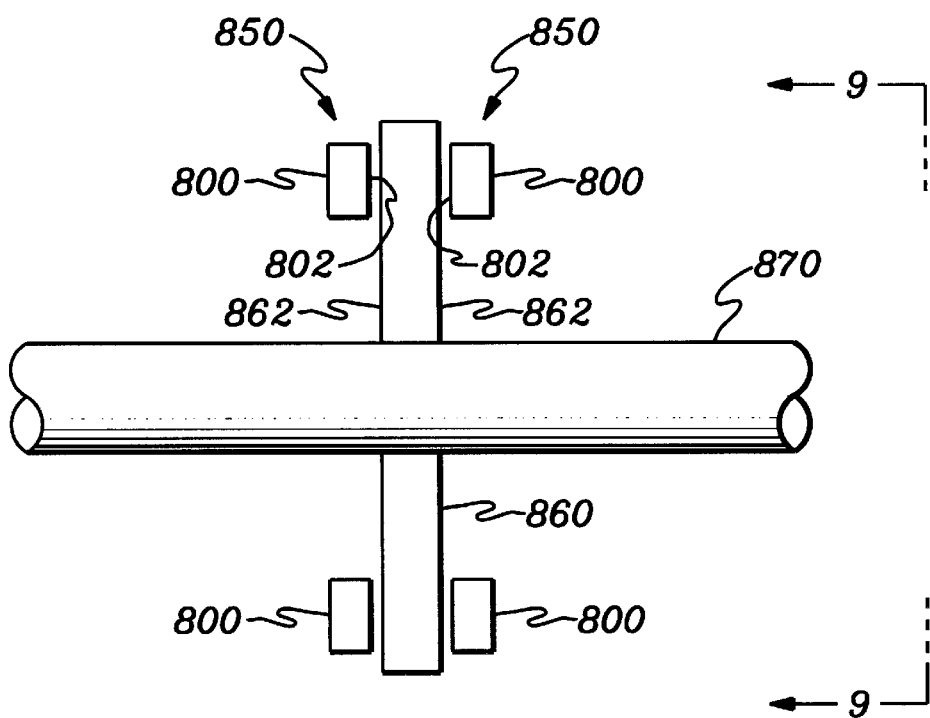
FIG. 8 is a side elevation view of one embodiment of a thrust bearing according to the present invention for axially supporting a runner attached to a shaft.
Figure 9:
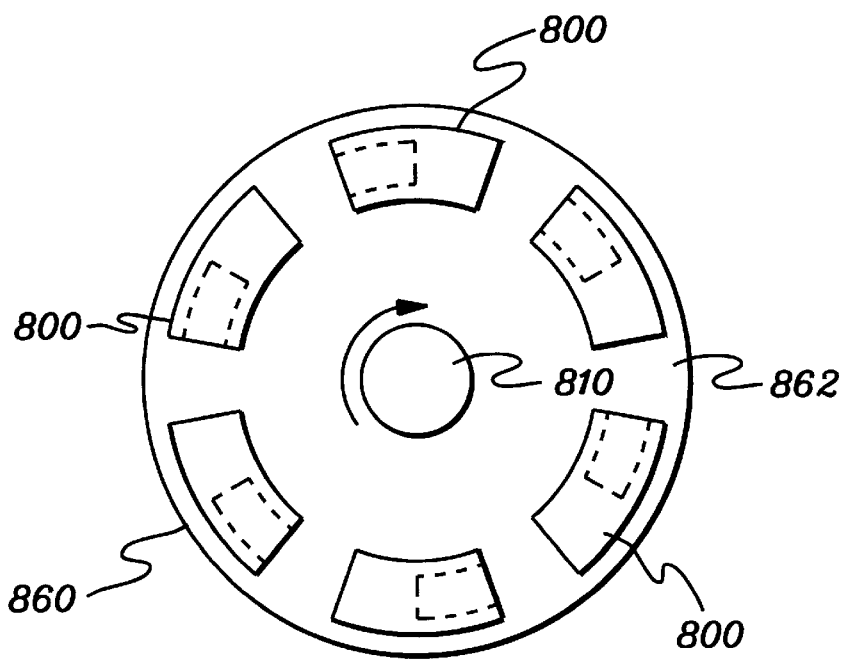
FIG. 9 is a view taken in the direction of arrows 9—9 of the thrust bearing of FIG. 8.

Turning now to FIGS. 8–18, therein illustrated are a plurality of thrust bearings (FIGS. 12, 13B, 13C, and 16A being journal bearing tilting pads) according to the present invention. As shown in FIGS. 8 and 9, therein illustrated are two thrust bearings 850 each of which includes a plurality of thrust bearing tilting pads 800 for inhibiting axial movement of a disk or runner 860 attached to and rotatable with a shaft 870 by operation of a prime mover (not shown in FIGS. 8 and 9). Tilting pads 800 are positioned around shaft 870 and include a face 802 which is disposed adjacent to a moving surface 862 of runner 860. Each of thrust bearings 850 inhibits movement of shaft 870 in one of the two axial directions. As described in greater detail below, the tilting pad thrust bearing includes a pocket which hydrodynamically increases support for the moving surface, stabilizes the tilting pad, and decreases horsepower loss.

Figure 10:
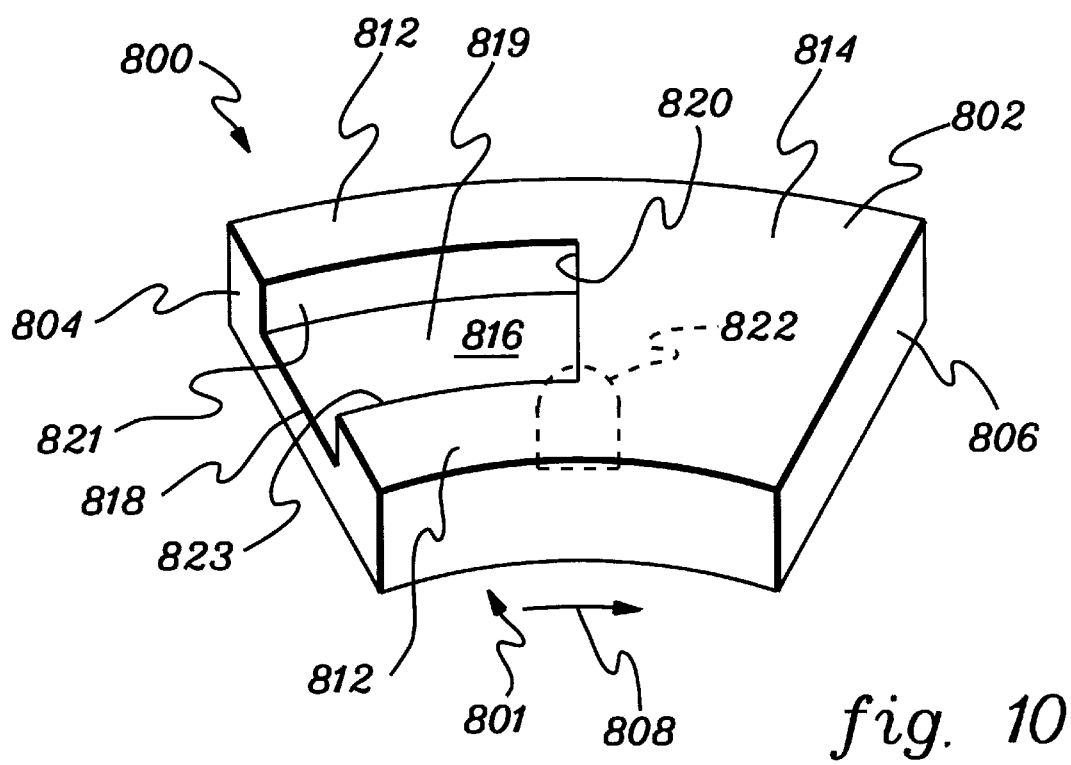
FIG. 10 is an enlarged perspective view of one of the thrust bearing tilting pads of FIG. 9 illustrating a face of the pad with a pocket having an abrupt step.

As best shown in FIG. 10, tilting pad 800 includes a body 801, face 802, and a leading portion 804 as well as a trailing portion 806. The tilting pad exhibits little or no cross-coupling, as discussed above. As shown in FIG. 10, the leading portion is positioned upstream relative to a rotation direction 808 of runner 860 (FIGS. 8 and 9). Also, the trailing portion is positioned downstream relative to rotation direction 808 of runner 860 (FIGS. 8 and 9). Face 802 extends longitudinally between the leading and trailing portions.

Face 802 also has a border region 812 with an engagement surface 814. In this exemplary embodiment, the border region is coextensive with the engagement surface. Also, the border region defines a pocket 816 having longitudinal sidebars 821, 823, a bottom 819, and an abrupt step 820. The angle of the abrupt step with respect to face 102 is in the range 89 degrees to 115 degrees, and is most preferably in the range 89 degrees to 91 degrees. In one preferred embodiment, the sidebars converge (not shown in FIG. 10) along rotation direction 808. This convergence reduces bulk proximity between a moving surface 862 (FIGS. 8 and 9) and face 802 at an entrance 818, and therefore reduces horsepower loss.

Thrust bearing tilting pad 800 is desirably a true-tilting pad pivotally supported by pivot 822. A housing (not shown) supports the pivot and holds lubricating fluid, which can be gaseous or liquid. In the thrust bearing, the true-tilting pads cooperate with one or more other pads, which additional pads could be formed in accordance with the present invention or conventionally. The true-tilting pad tilts free of engagement with the other pads. Moreover, true-tilting pad 800 and the other pads cooperate with each other and the fluid to hydrodynamically and mechanically increase axial support of runner 860 (FIGS. 8 and 9) during rotation of shaft 870 (FIGS. 8 and 9).

Abrupt step 820 hydrodynamically constricts flow of fluid during the rotation of runner 860 (FIGS. 8 and 9). Entrance 818 and sidebars 821 and 823 feed the fluid for flow through pocket 816 and over the abrupt step 820. That is, the abrupt step constitutes an abrupt reduction in flow area that forces the streamlines of the fluid to dramatically converge. This abrupt restriction builds up a large pressure on face 802 upstream, relative to the rotation of the shaft, of abrupt step 820. The abrupt step hydrodynamically enhances the wedge effect. Therefore, the fluid flows relatively faster between abrupt step 820 and moving surface 862 (FIGS. 8 and 9) than immediately upstream. This yields relatively increased pressure immediately upstream of abrupt step 820.

Figure 11:
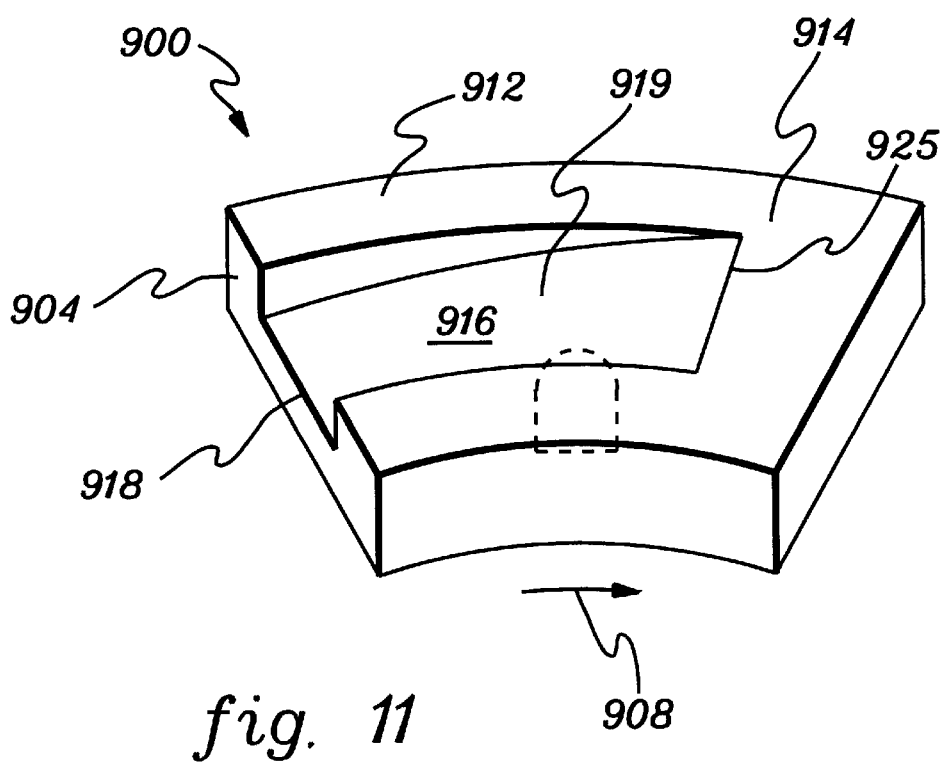
FIG. 11 is a perspective view of another embodiment of a thrust bearing tilting pad according to the present invention illustrating a face of the pad with a generally tapered pocket.

FIG. 11 illustrates another embodiment of a thrust bearing tilting pad 900 according to the present invention for use in thrust bearing 850 (FIG. 8). Tilting pad 900 includes a pocket 916 having a bottom 919, an entrance 918 (e.g., a first location) and a termination 925 (e.g., a second location) of pocket 916. Relative to a rotation direction 908 of a runner (not shown), the entrance comprises a port and/or channel for entry of fluid into pocket 916, and the termination comprises a port and/or channel for exit of the fluid from pocket 916. For instance, the bottom slopes and/or curves (e.g., gradually and/or continuously) from the entrance to the termination, to form a (e.g., tapered, gradually diminishing, sloped, and/or curved) profile for the pocket. Termination 925 meets, connects, joins, and/or merges with a border region 912 and/or an engagement surface 914.

Still referring to FIG. 11, pocket 916 can taper from a (e.g., maximal) depth at a leading portion 904 of pad 900, to (e.g., nearly or substantially) zero depth when meeting border region 912 and/or engagement surface 914 of the pad. The depth of entrance 918, in one example and relative to border region 912, is in the approximate range of 50 μm (0.002 in.) to 153 μm (0.006 in.).

Figure 12:
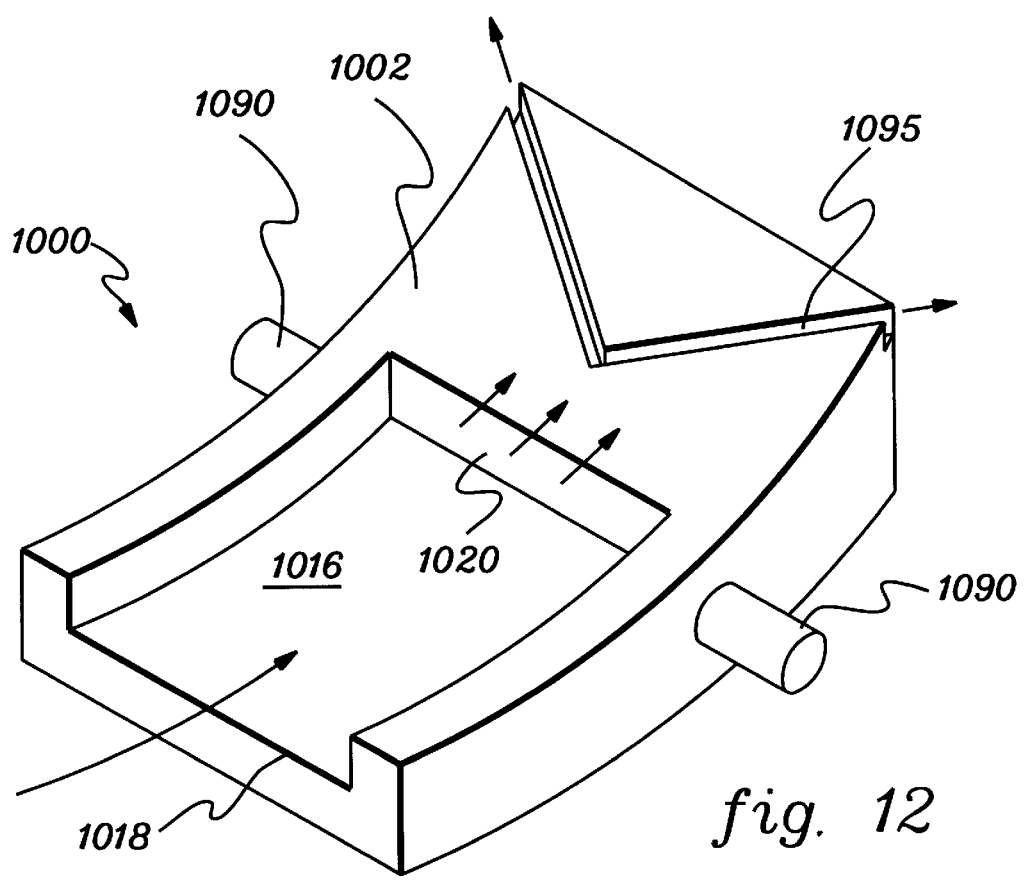
FIG. 12 is a perspective view of another embodiment of a journal bearing tilting pad according to the present invention illustrating a face with a groove for collecting and redirecting the exiting fluid.

FIG. 12 illustrates another embodiment of a journal bearing tilting pad 1000 having a pocket 1016 according to the present invention for use in journal bearing 300 (FIG. 2A). In addition, tilting pad 1000 is pivotable about an axis defined by two laterally-extending pins 1090. Desirably, pins 1090 are supported by a housing (not shown). In this illustrated embodiment, tilting pad 1000 also includes a face 1002 having a V-shaped groove 1095. The ends of the legs of V-shaped groove 1095 are disposed adjacent the lateral edges of tilting pad 1000. During operation, fluid enters an entrance 1018, flows through pocket 1016, flows over an abrupt step 1020 and across face 1002, and then is received in V-shaped groove 1095. Thereafter, the fluid is discharged to the lateral sides of the tilting pad.

Figure 13A:
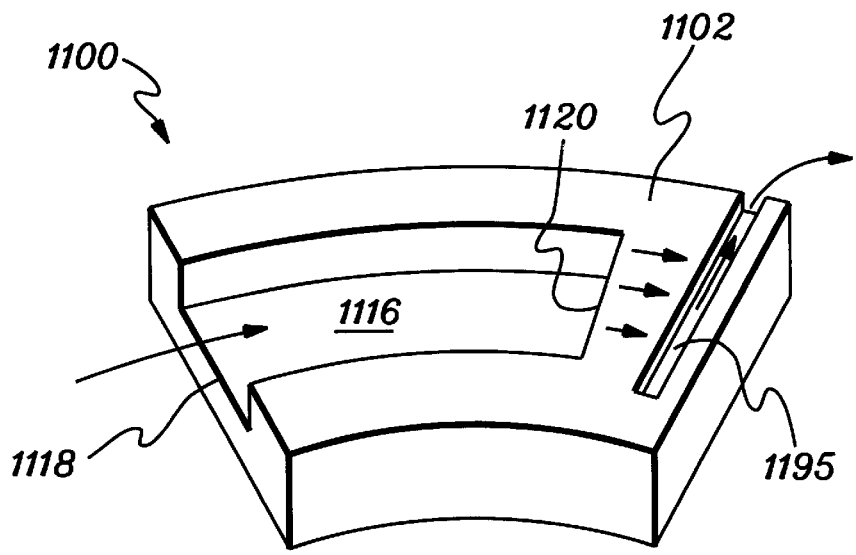
FIG. 13A is a perspective view of another embodiment of a thrust bearing tilting pad according to the present invention illustrating another embodiment of a groove for collecting and redirecting the exiting fluid.

FIG. 13A illustrates another embodiment of a thrust bearing tilting pad 1100 having a pocket 1116 according to the present invention for use in thrust bearing 850 (FIG. 8). In this illustrated embodiment, tilting pad 1100 includes a face 1102 having an elongated groove 1195 for directing lubricating fluid flow. One of the ends of elongated groove 1195 is disposed and opens onto an outer lateral curved edge of tilting pad 1100. During operation, fluid enters an entrance 1118, flows through pocket 1116, flows over an abrupt step 1120 and across face 1102, and then is received in elongated groove 1195. Thereafter, the fluid is discharged to the outer lateral edge of the tilting pad. From the present descriptions, it will be appreciated by those skilled in the art that grooves having other configurations may be equally employed. Desirably, the grooves are integrally formed in the body of the pad. In addition, each end of the groove may discharge or exit fluid to a respective side of the pad.

Figure 13B:
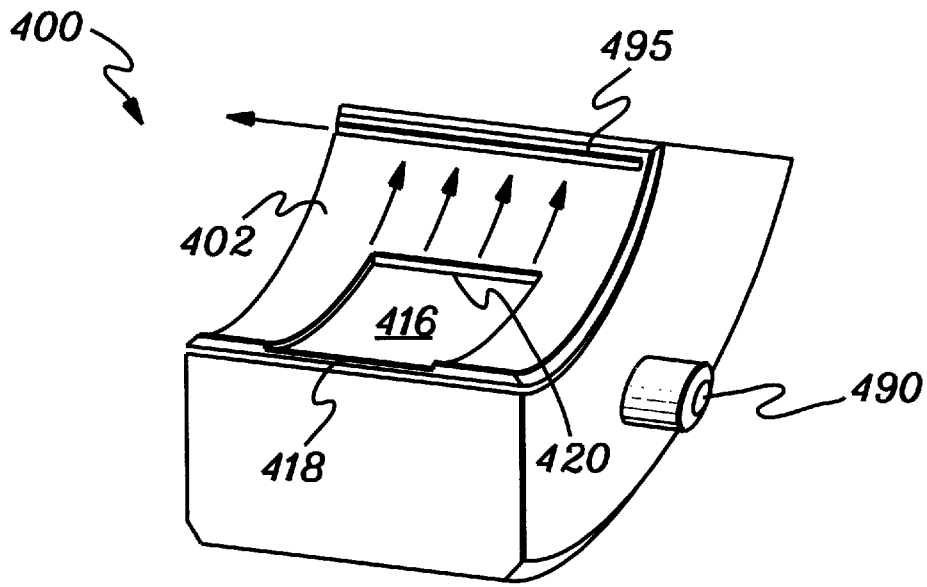
FIG. 13B is a perspective view of a journal bearing tilting pad according to the present invention illustrating a face with a groove for collecting and redirecting the exiting fluid.

In a similar manner, FIG. 13B illustrates one embodiment of a journal bearing tilting pad 400 according to the present invention for use in journal bearing 300 (FIG. 2A). Tilting pad 400 is pivotable about an axis defined by two laterally-extending pins 490. Desirably, pins 490 are supported by a housing (not shown). In this illustrated embodiment, tilting pad 400 includes a face 402 having an elongated groove 495 for directing lubricating fluid flow. One of the ends of elongated groove 495 is disposed and opens onto an outer lateral curved edge of tilting pad 400. During operation, fluid enters an entrance 418, flows through pocket 416, flows over an abrupt step 420 and across face 402, and then is received in elongated groove 495. Thereafter, the fluid is discharged to the outer lateral edge of the tilting pad. Desirably, where a combination journal bearing and thrust bearing are configured together, the groove on the journal bearing tilting pad desirably opens onto the side of the journal bearing tilting pad opposite from the thrust bearing. This setup directs lubricating fluid used in the journal bearing away from the thrust bearing thereby minimizing or reducing the amount of heated lubricating fluid from the journal bearing reaching the thrust bearing. From the present descriptions, it will be appreciated by those skilled in the art that the tilting pad may have grooves having other configurations such as the V-shaped grooved described above. Desirably, the grooves are integrally formed in the body of the pad. In addition, each end of the groove may discharge or exit fluid to a respective side of the pad.

Figure 13C:
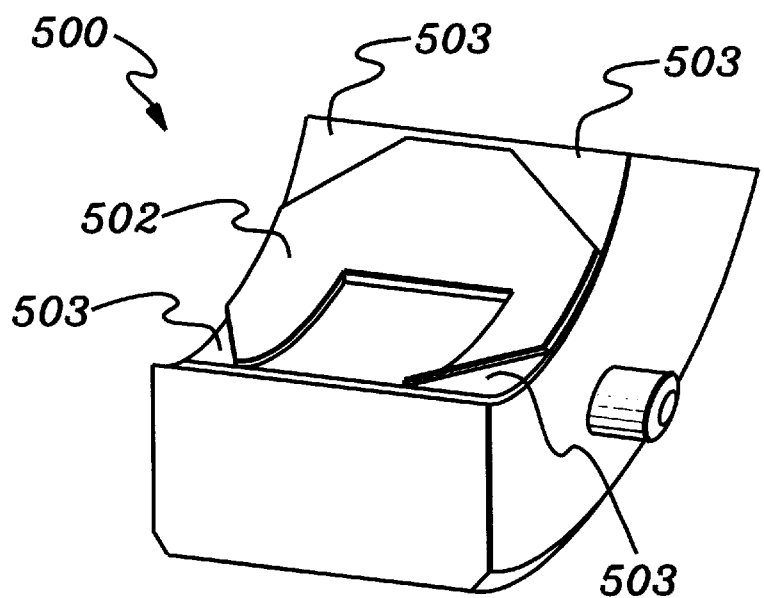
FIG. 13C is a perspective view of a journal bearing tilting pad according to the present invention illustrating a face having recessed portions for reducing horsepower consumption.

FIG. 13C illustrates another embodiment of a journal bearing tilting pad 500 according to the present invention for use in journal bearing 300 (FIG. 2A). Tilting pad 500 includes at least one recessed portion 503 disposed at the corner of a face 502. The recessed portions allow a reduction in the horsepower consumption without reducing load capacity. The recessed portions are typically about 0.05 inch to about 0.1 inch.

Figure 14:
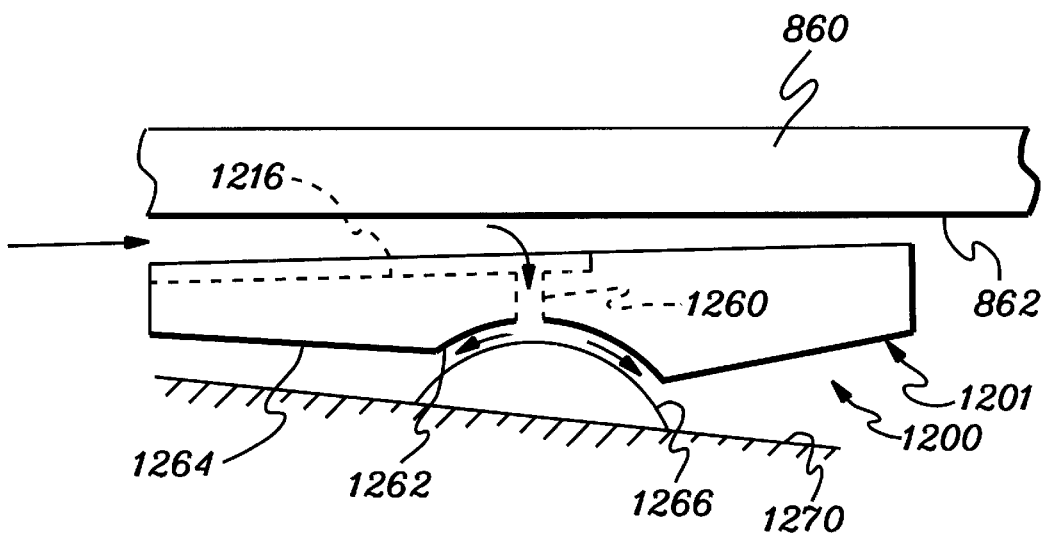
FIG. 14 is a perspective view of another embodiment of a thrust bearing tilting pad according to the present invention illustrating a hydrostatic dampened pivot.
Figure 15:
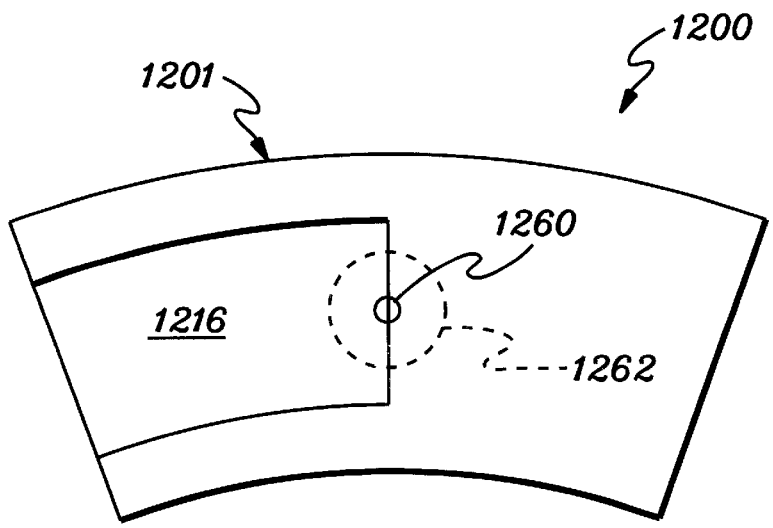
FIG. 15 is a top view of the thrust bearing tilting pad shown in FIG. 14.

FIGS. 14 and 15 illustrate another embodiment of a thrust bearing tilting pad 1200 according to the present invention for use in thrust bearing 850 (FIG. 8). In this illustrated embodiment, tilting pad 1200 includes feedhole 1260, extending through a body 1201 from a pocket 1216 to a cavity 1262 on a backside 1264 of tilting pad 1200 to allow feeding of fluid from pocket 1216 down to cavity 1262. This works to float the tilting pad over a spherical pivot 1266 of a housing 1270.

The higher pressures, discussed above, produced by pocket 1216 can also increase pressure on the fluid about feedhole 1260 of the hydrostatic pivot, thereby improving the floating performance of tilting pad 1200 as well. This advantageously increases the hydrostatic pressure on tilting pad 1200 in a direction away from spherical pivot 1266 of housing 1270.

Figure 16A:
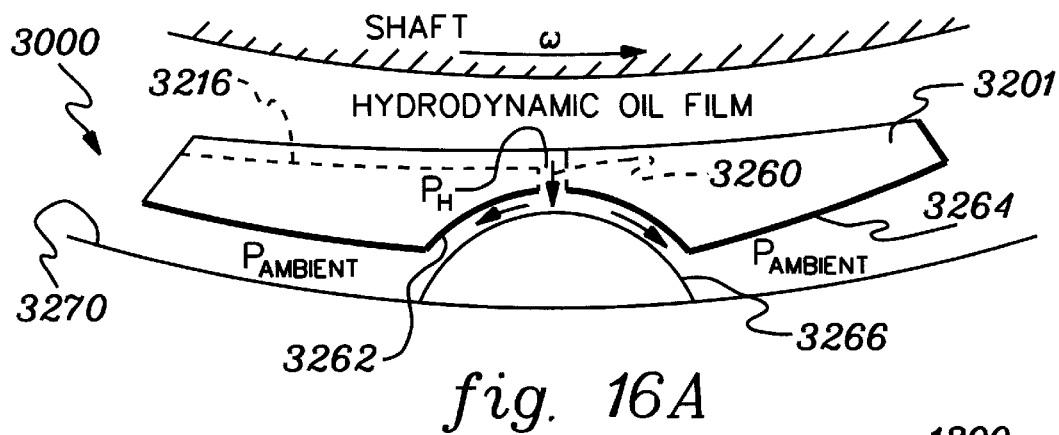
FIG. 16A is a side elevational view of another embodiment of a journal bearing tilting pad according to the present invention.

FIG. 16A illustrates another embodiment of a journal bearing tilting pad 3000 according to the present invention for use in a journal bearing. In this illustrated embodiment, tilting pad 3000 includes feedhole 3260, extending through a body 3201 from a pocket 3216 to a cavity 3262 on a backside 3264 of tilting pad 3200 to allow feeding of fluid from pocket 3216 down to cavity 3262. This works to float the tilting pad over a spherical pivot 3266 of a housing 3270.

Typically, analysis for calculating stiffness and damping coefficients of tilting pad journal bearings includes the simplifying assumption that the tilting pads (mechanical pad structure) are infinitely stiff in the radial direction. A more complete analysis considers the elasticity of the pad pivot and the elasticity of the housing. The assumption that the pad is infinitely stiff has significant effect on a bearing's stiffness and damping dynamic coefficients. The local elastic deflection at the pad contact point due to Hertzian contact stresses acts as a spring. This spring must be combined with the fluid film stiffness and damping characteristics. This additional flexibility reduces the effective stiffness and damping of each pad and therefore of the entire bearing. It is important to note that the pivot configuration and contact profile from the Hertzian contact have a significant effect on the bearing stiffness and damping. For example, line contact (single tilt) pivots are stiffer than elliptical contact (double tilt) pivots.

A common practice of "adjusting for" the Hertzian contact effect has been to reduce the total stiffness values utilized for the bearing supports. Having calculated the oil film characteristics, the total bearing support stiffnesses could be derived by adjusting them until the calculated response to unbalance curve correlates with measured data. This "calibration" is lost when either the bearing type, bearing supports or rotor are changed.

A generalized approach is to properly account for the Hertzian deflection of the pivot. The stiffness and damping coefficients are determined for each particular pivot geometry in addition to pad geometry and applied load. Standard published data for fluid films cannot be used directly. The interaction of pivot flexibility and the fluid film is more complex than simply adding an additional stiffness in series with the unmodified bearing data. When the Hertzian deflections are considered in the analysis, all of the fluid film coefficients will be modified because the deflected pad changes the position of the journal relative to the other adjacent pads.

Besides pivot configuration, considerable variation is found in the characteristics of tilting pad bearings depending on how the pivot is physically attached to the pad. Most pad designs have the pivot integral with the pad. For such configurations a calculated Hertzian deflection will result in accurate stiffness predictions. Other designs have one or more shims between the pivot and the pad to enable better dimensional control of bearing clearances. Still other designs include a separate hardened pivot attached to the pad. These pieces introduce gaps and therefore elasticity and are not in perfect contact due to slight deviations in the contours of mating surfaces. Under these conditions, the stiffness characteristics are reduced from the theoretical Hertzian value. This is a significant effect in further reducing stiffness and damping of the bearing. For such "assembled" tilting pad designs, the load-deflection characteristic can be experimentally determined and included in the bearing analysis.

Figure 16B:
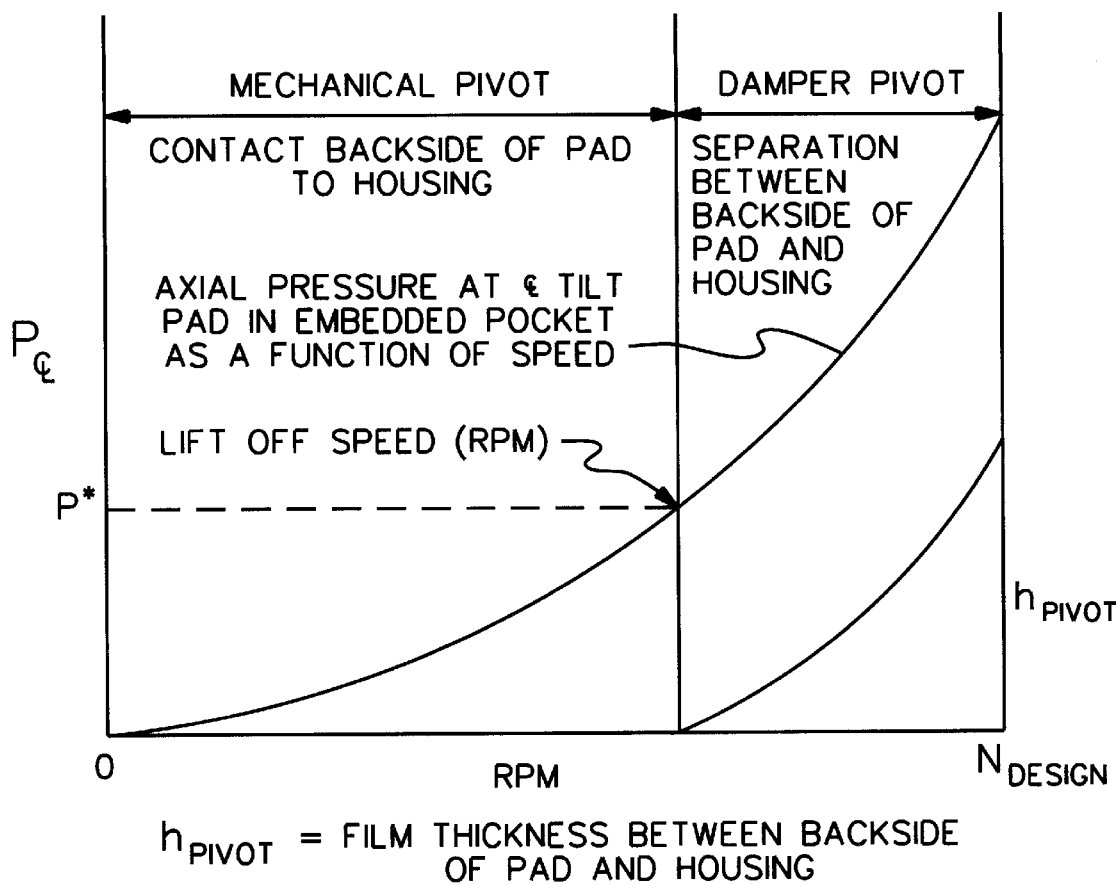
FIG. 16B is a graph of pressure verses speed of the shaft across the centerline for the journal bearing tilting pad shown in FIG. 16A.

With the embodiment of the journal bearing shown in FIG. 16A, the pivot stiffness and pivot damping are developed in a hydrostatic fluid film which is positioned between the housing and the backside of the tilting pad. The damper pivot is fed by tapping into the high pressure fluid developed on the concave face of the pad. If the pad is designed to include an embedded pocket, then the high pressure developed in or downstream from the trailing edge of the pocket can be used to feed the damper pivot. High pressure fluid is conducted through the tilting pad into a pocket or region on the backside of the tilting pad. The pocket fills with the high pressure fluid which then flows through the space between the edges of the pocket in the tilt pad and the housing. The space is produced by the force of the high pressure fluid pushing radially inward (lift off) on the tilt pad. The pad moves inward until a force balance is achieved between the load on the face of the tilt pad and the hydrostatic action of the damper pivot on the backside of the tilt pad. FIG. 16B illustrates a plot of the pressure verses the rotational speed of the shaft across the centerline for the journal bearing tilting pad shown in FIG. 16A. This concept applies equally well to a thrust bearing tilting pad.

The hydrostatic film established by the flow and force balance possesses stiffness ($lb_f$/in) and damping ($lb_f s$/in). The forces act in series with the hydrodynamic stiffness and damping. The journal steady state load plus the weight of the pad equals the load capacity of the hydrostatic pivot. Perturbation about the equilibrium position i.e., displacement and velocity will give the pivot stiffness and pivot damping.

Figure 17:
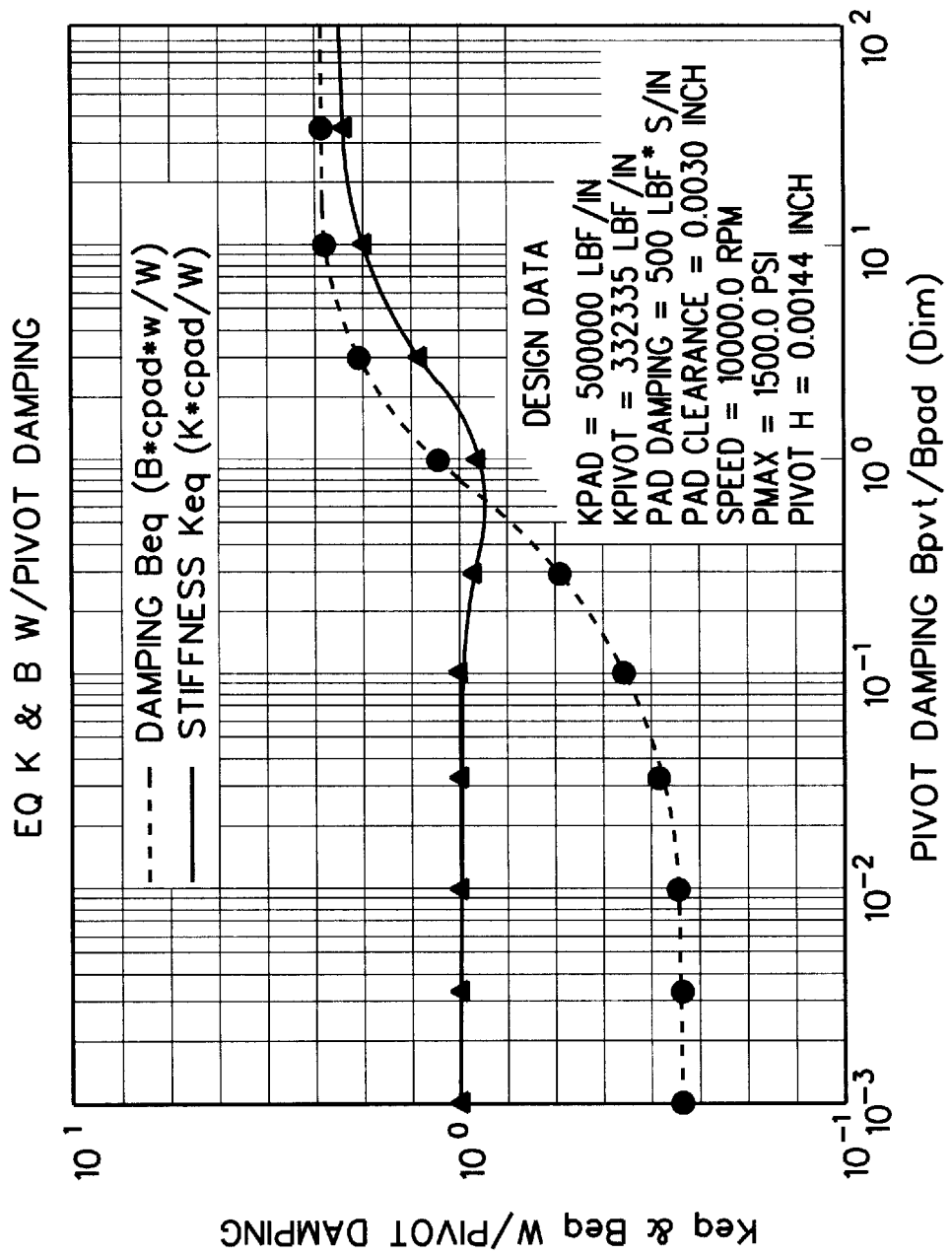
FIG. 17 is a graph of stiffness and damping characteristics of a hydrodynamic fluid film on the face of the pad and the hydrostatic fluid film on the back side of the pad combined to yield an equivalent stiffness and damping on the tilting pad bearing.

The stiffness and damping of the hydrostatic damper pivot can be calculated by perturbing the equilibrium position of the tilting pad. FIG. 17 illustrates a plot of the combined stiffness and damping characteristics of the hydrodynamic fluid film on the face of the pad and the hydrostatic fluid film on the backside of the pad combine to yield an equivalent stiffness and damping of the tilting pad bearing.

The plot shows the equivalent stiffness and damping for a wide range of pivot damping. By inspection of the plot one can see that the damping of the system has a maximum value and that the dynamic characteristics vary significantly depending on the pivot damping, i.e., the pivot design. The plot shows that it is possible to achieve a significant increase in the overall bearing damping by suitable design of a damper pivot.

The damper pivot is presented by example applied to a tilting pad journal bearing. The damper pivot functions equally well when embodied in a tilting pad thrust bearing.

Figure 18:
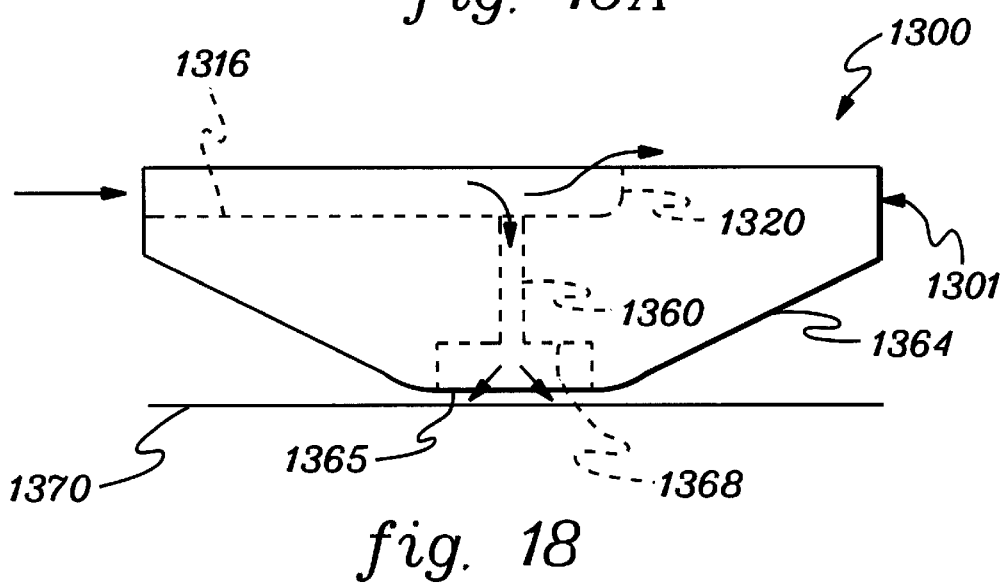
FIG. 18 is a side elevational view of another embodiment of a thrust bearing tilting pad according to the present invention.

FIG. 18 illustrates still another embodiment of a thrust bearing tilting pad 1300 according to the present invention for use in thrust bearing 850 (FIG. 8). Tilting pad 1300 includes a backside 1364 having a curved surface portion 1365 and a cutout 1368 which is disposed adjacent to the inner surface of a housing 1370. In this illustrated embodiment, tilting pad 1300 also includes feedhole 1360, extending through a body 1301 from a pocket 1316 to backside 1364 of tilting pad 1300 to allow feeding of fluid from pocket 1316 down to backside 1364. This works to float the tilting pad over a portion of housing 1370.

In addition, as shown in FIG. 18, tilting pad 1300 includes a pocket with a concave surface portion 1320 to define a pocket having a very rapidly localized converging profile at the curved portion. This profile results in the film thickness varying very rapidly in certain regions," i.e., at the curved portion or "step like" configuration. Importantly, the hydrodynamic flow area is very rapidly constricted in this localized region which causes a dramatic increase in film pressure and therefore load carrying capacity. The concave surface portion may be formed using a rotary cutting tool or bit having an outer radius which corresponds to the inner radius of the concave surface portion. This concept applies equally well for a thrust or a journal bearing.

Figure 19:
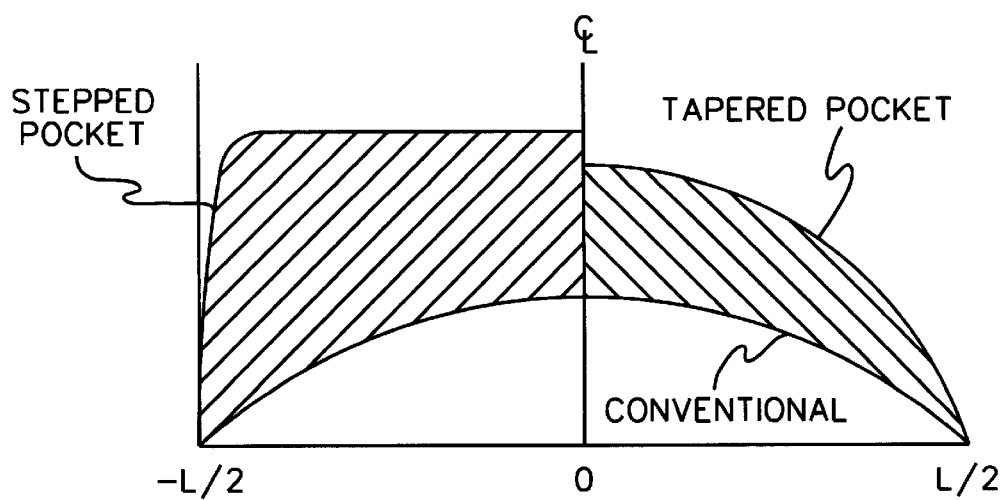
FIG. 19 is a cutaway, sectional, end view of a tilting pad illustrating an exemplarily fluid pressure distribution.

FIG. 19 illustrates the axial pressure distribution for each type of bearing such as a conventional pad having a smooth pressure profile, a pad with a tapered pocket having a parabolic pressure profile, and a pad having a pocket with an abrupt step having a trapezoidal pressure profile. As shown in FIG. 19, a pad having a pocket with an abrupt step or stepped pocket which produces a nearly constant pressure distribution in the axial direction. A pad having a tapered pocket produces a parabolic pressure distribution, which is greater than the conventional smooth bearing profile. The load capacity can be determined by a summation of the pressure distribution over the pad area. Thus, a pad having a pocket having an abrupt step results in the greatest load capacity. A pad having a tapering pocket has a load capacity greater than the conventional smooth pad bearing, but less than a pad having an abrupt step.

The face of the described journal tilting pads and thrust tilting pads may include wear surface such as a high temperature polycarbonate plastic material, a babbitt or brass material, or any other suitable material. The wear material may be applied by coating, welding, or other suitable attaching means.

Figure 20:
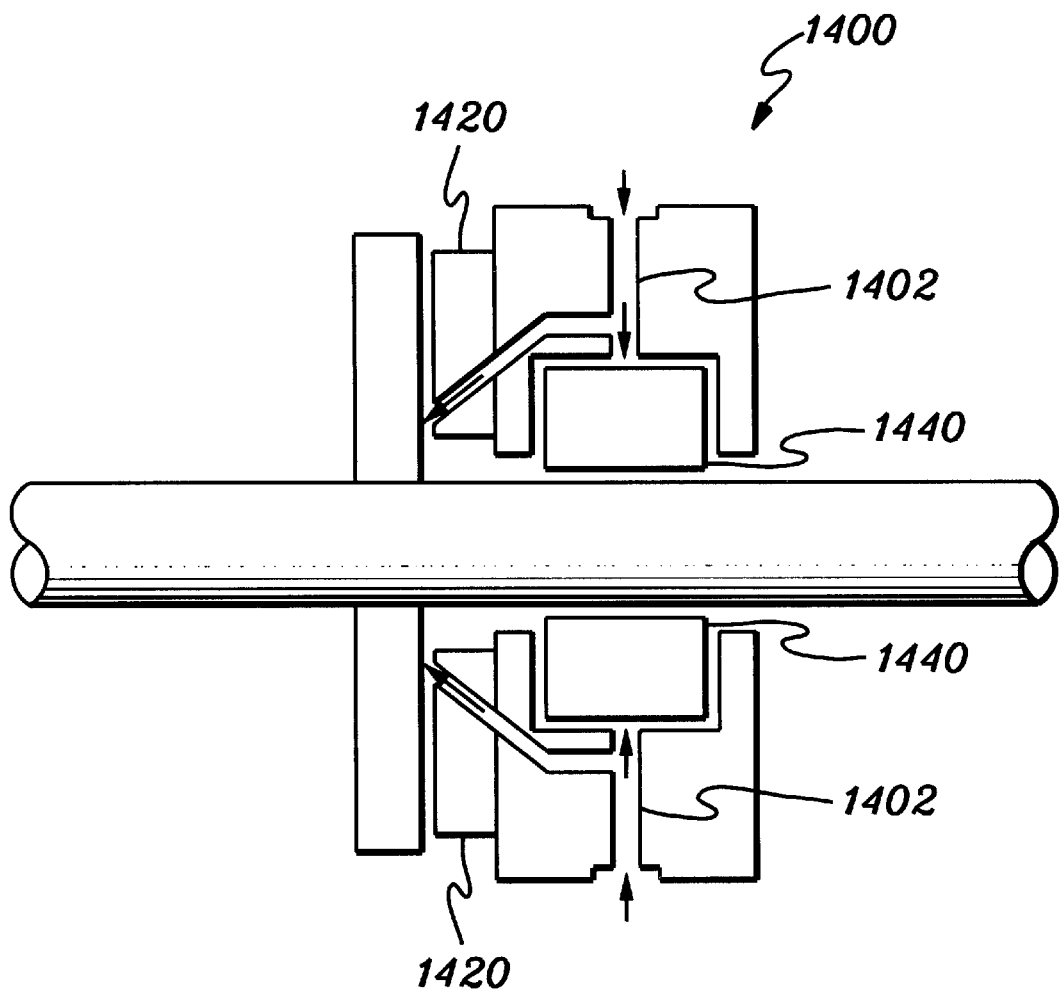
FIG. 20 is a side elevational view, in part section, of a combination thrust bearing and journal bearing having a conduit for supplying fluid directly to both the thrust bearing and journal bearing.

FIG. 20 illustrates a combination thrust bearing and journal bearing 1400 having a fluid distribution conduit 1402 for supplying fluid to both a thrust bearing 1420 and to a journal bearing 1440, i.e., a first portion of a pressurized fluid to the thrust bearing and a second portion of the pressurized fluid to the journal bearing. Both the thrust bearing and the journal bearing may comprise conventional bearings, i.e., having a fixed pad or non-movable pad. Alternatively, the thrust bearing and the journal bearing may comprise a tilting pad as described above, or a true-tilting pad as described above. Further, it will be appreciated that various combination of fixed, tilting, or true-tilting pad for the thrust bearing and the journal bearing may be employed.

Providing a combination thrust bearing and a journal bearing having a fluid distribution conduit which supplies fluid to both the thrust bearing and the journal bearing results in both the thrust bearing and the journal bearing receiving fluid at the same pressure. Desirably, fluid having a relatively low temperature is supplied to the fluid distribution conduit at about 25 psi. This configuration of the fluid distribution conduit provides better control of fluid to the bearings by reducing the likelihood of starving the thrust bearing compared to the prior art which includes a first conduit that provides fluid to the journal bearing (e.g., at 25 psi) and a second separate orifice which extends between the journal bearing and the thrust bearing for transferring fluid in lubricating the journal bearing (e.g., low pressure, 5 to 10 psi, heated fluid) to the thrust bearing.

As shown in the various embodiments of the tilting pad, the pocket generally extends adjacent to a point about which the tilting pad pivots, and desirably extends over the point about which the tilting pad pivots. In addition, it will be appreciated that the various disclosed pockets, body shapes, cavities, feedholes, of the tilting pads may be combined in various combinations for use in thrust or journal bearings.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said pocket extends at least one of a) adjacent to a location about which said thrust bearing tilting pad is pivotable, and b) over said location about which said thrust bearing tilting pad is pivotable.

2. The thrust bearing tilting pad of claim 1 wherein said pocket comprises a varying thickness for localized constriction of the fluid between said pad and said moving surface during movement of the moving surface.

3. The thrust bearing tilting pad of claim 1 wherein said pocket comprises an abrupt step.

4. The thrust bearing tilting pad of claim 1 wherein said pocket comprises a tapered profile.

5. The thrust bearing tilting pad of claim 1 wherein said pocket comprises a generally concave surface portion.

6. The thrust bearing tilting pad of claim 1 wherein said face comprises at least one recessed portion.

7. The thrust bearing tilting pad of claim 1 wherein said border region of said face comprises recessed corner portions.

8. The thrust bearing tilting pad of claim 1 wherein said leading portion comprises a leading edge defining an entrance to said pocket.

9. The thrust bearing tilting pad of claim 1 wherein said pocket extends adjacent to said location about which said thrust bearing tilting pad is pivotable.

10. The thrust bearing tilting pad of claim 1 wherein said pocket extends over said location about which said thrust bearing tilting pad is pivotable.

11. The thrust bearing tilting pad of claim 1 further comprising a backside defining a cavity about which said thrust bearing tilting pad is supportable.

12. The thrust bearing tilting pad of claim 1 further comprising a backside and a conduit between said pocket and said backside, and wherein during movement of the moving surface said pocket hydrodynamically increases pressure on the moving surface and hydrostatically increases pressure between said backside and an inner surface of the housing.

13. The thrust bearing tilting pad of claim 1 further comprising a backside defining a cavity and a conduit between said pocket and said cavity, and wherein during movement of the moving surface said pocket hydrodynamically increases pressure on the moving surface and hydrostatically increases pressure in said cavity for supporting said thrust bearing tilting pad.

14. The thrust bearing tilting pad of claim 1 further comprising a pair of laterally-extending pins defining an axis about which said thrust bearing tilting pad is pivotable.

15. The thrust bearing tilting pad of claim 1 wherein said face comprises a groove for directing fluid from said face.

16. The thrust bearing tilting pad of claim 15 wherein said groove comprises a V-shaped configuration.

17. The thrust bearing tilting pad of claim 15 wherein said groove comprises at least one outlet for discharging fluid to at least one lateral edge of said face.

18. The thrust bearing tilting pad of claim 1 wherein said border region defines said pocket interiorly with respect to said face.

19. The thrust bearing tilting pad of claim 1 wherein said thrust bearing tilting pad is supportable by a pivot, and wherein the movement of the moving surface results in forced hydrodynamic engaging of the fluid with said face that promotes an increase in oscillation tendencies of said thrust bearing tilting pad; and wherein relative dimensions of said pocket hydrodynamically generate a load on said face that decreases the oscillation tendencies.

20. The thrust bearing tilting pad of claim 1 wherein said pocket hydrodynamically generates an increased constriction in flow of the fluid during the movement of the moving surface.

21. The thrust bearing tilting pad of claim 1 wherein relative dimensions of said pocket and said engagement surface decrease an amount of horsepower that must be expended to effect the movement of the moving surface.

22. The thrust bearing tilting pad of claim 1 wherein said pocket has a longitudinal length and said leading and said trailing portions have a longitudinal length therebetween; and wherein a ratio of said longitudinal length of said pocket to said longitudinal length between said leading and said trailing portions is in the range of 0.40 to 0.85.

23. The thrust bearing tilting pad of claim 1 wherein said longitudinal sidebars generally converge along the direction of movement of the moving surface.

24. The thrust bearing tilting pad of claim 1 wherein said pocket hydrodynamically causes at least one of a substantially continuous and generally trapezoidal distribution of pressure in the fluid between said thrust bearing tilting pad and the moving surface during movement of the moving surface.

25. The thrust bearing tilting pad of claim 1 wherein said face comprises at least one of a plastic material, a babbitt material, and a brass material.

26. A thrust bearing comprising a plurality of tilting pads of claim 1 for inhibiting axial motion of a shaft in at least one direction.

27. A thrust bearing comprising a plurality of tilting pads of claim 1 for inhibiting axial motion of a shaft in two directions.

28. A combination thrust bearing and journal bearing for supporting a shaft having a runner, the combination comprising:

a thrust bearing comprising a plurality of tilting pads of claim 1 for axially supporting the runner; and a journal bearing for radially supporting the shaft.

29. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said pocket extends at least one of a) adjacent to a location about which said thrust bearing tilting pad is pivotable, and b) over said location about which said thrust bearing tilting pad is pivotable.

30. The true-tilting pad of claim 29 wherein said pocket comprises a varying thickness for localized constriction of the fluid between said pad and said moving surface during movement of the moving surface.

31. The true-tilting pad of claim 29 wherein said pocket comprises an abrupt step.

32. The true-tilting pad of claim 29 whrein said pocket comprises a tapered profile.

33. The true-tilting pad of claim 29 wherein said pocket comprises a generally concave surface portion.

34. The true-tilting pad of claim 29 wherein said face comprises at least one recessed portion.

35. The true-tilting pad of claim 29 wherein said border region of said face comprises recessed corner portions.

36. The true-tilting pad of claim 29 wherein said leading portion comprises a leading edge defining an entrance to said pocket.

37. The true-tilting pad of claim 29 wherein said pocket extends adjacent to said location about which said tilting pad is pivotable.

38. The true-tilting pad of claim 29 wherein said pocket extends over said location about which said tilting pad is pivotable.

39. The true-tilting pad of claim 29 further comprising a backside defining a cavity about which said tilting pad is supportable.

40. The true-tilting pad of claim 29 further comprising a backside and a conduit between said pocket and said backside, and wherein during movement of the moving surface said pocket hydrodynamically increases pressure on the moving surface and hydrostatically increases pressure between said backside and an inner surface of the housing.

41. The true-tilting pad of claim 29 further comprising a backside defining a cavity and a conduit between said pocket and said cavity, and wherein during movement of the moving running surface said pocket hydrodynamically increases pressure on the moving surface and hydrostatically increases pressure in said cavity for supporting said true-tilting pad.

42. The true-tilting pad of claim 29 further comprising a pair of laterally-extending pins defining an axis about which said true-tilting pad is pivotable.

43. The true-tilting pad of claim 29 wherein said face comprises a groove for directing fluid from said face.

44. The true-tilting pad of claim 43 wherein said groove comprises a V-shaped configuration.

45. The true-tilting pad of claim 43 wherein said groove comprises at least one outlet for discharging fluid to at least one lateral edge of said face.

46. The true-tilting pad of claim 29 wherein said border region defines said pocket interiorly with respect to said face.

47. The true-tilting pad of claim 29 wherein said true-tilting pad is supportable by a pivot, and wherein the movement of the moving surface results in forced hydrodynamic engaging of the fluid with said face that yields a spragging force about the pivot and downstream relative to the movement of the moving running surface; and wherein relative dimensions of said pocket hydrodynamically generate pressure in the fluid that effects on said face a counteraction force about the pivot and upstream relative to the direction of the moving running surface in order to counteract the spragging force.

48. The true-tilting pad of claim 29 wherein said true-tilting pad is supportable by a pivot, and wherein the movement of the moving running surface results in forced hydrodynamic engaging of the fluid with said face that promotes an increase in oscillation tendencies of said true-tilting pad; and wherein relative dimensions of said pocket hydrodynamically generate a load on said face that decreases the oscillation tendencies.

49. The true-tilting pad of claim 29 wherein said pocket hydrodynamically generates an increased constriction in flow of the fluid during the movement of the moving surface.

50. The true-tilting pad of claim 29 wherein relative dimensions of said pocket and said engagement surface decrease an amount of horsepower that must be expended to effect the movement of the moving surface.

51. The true-tilting pad of claim 29 wherein said pocket has a longitudinal length and said leading and said trailing portions have a longitudinal length therebetween; and wherein a ratio of said longitudinal length of said pocket to said longitudinal length between said leading and said trailing portions is in the range of 0.40 to 0.85.

52. The true-tilting pad of claim 29 wherein said longitudinal sidebars generally converge along the direction of movement of the moving surface.

53. The true-tilting pad of claim 29 wherein said pocket hydrodynamically causes at least one of a substantially continuous and generally trapezoidal distribution of pressure in the fluid between said true-tilting pad and the moving surface during movement of the moving running surface.

54. The true-tilting pad of claim 29 wherein said face comprises at least one of a plastic material, a babbitt material, and a brass material.

55. A thrust bearing comprising a plurality of true-tilting pads of claim 29 for inhibiting axial motion of a shaft in at least one direction.

56. A thrust bearing comprising a plurality of true-tilting pads of claim 29 for inhibiting axial motion of a shaft in two directions.

57. A combination thrust bearing and journal bearing for supporting a shaft having a runner, the combination comprising:

a thrust bearing comprising a plurality of true-tilting pads of claim 29 for axially supporting the runner in at least one direction; and a journal bearing comprising a plurality of true-tilting pads of claim 29 for radially supporting the shaft.

58. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said border region of said face comprises recessed corner portions.

59. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and a backside defining a cavity about which said thrust bearing tilting pad is supportable.

60. The thrust bearing tilting pad of claims 59 wherein a conduit extends between said pocket and said cavity, and wherein during movement of the moving surface said pocket hydrodynamically increases pressure on the moving surface and hydrostatically increases pressure in said cavity for supporting said thrust bearing tilting pad.

61. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and a backside and a conduit between said pocket and said backside, and wherein during movement of the moving surface said pocket hydrodynamically increases pressure on the moving surface and hydrostatically increases pressure between said backside and an inner surface of the housing.

62. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said face comprises a groove for directing fluid from said face, and wherein said groove comprises a V-shaped configuration.

63. A thrust bearing tilting pad pivotally supported and adapted to cooperate with one or more other pads and a fluid within a housing to hydrodynamically and mechanically support a moving surface of a runner attached to a shaft, said tilting pad comprising:

a leading portion adapted to be positioned upstream relative to a direction of movement of the moving surface;

a trailing portion adapted to be positioned downstream relative to the direction of movement of the moving surface;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said pocket hydrodynamically causes at least one of a substantially continuous and generally trapezoidal distribution of pressure in the fluid between said thrust bearing tilting pad and the moving surface during movement of the moving surface.

64. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said border region of said face comprises recessed corner portions.

65. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and a backside defining a cavity about which said tilting pad is supportable.

66. The true tilting pad of claim 65 wherein a conduit extends between said pocket and said cavity, and wherein during movement of the moving running surface said pocket hydrodynamically increases pressure on the moving surface and hydrostatically increases pressure in said cavity for supporting said true-tilting pad.

67. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and a backside and a conduit between said pocket and said backside, and wherein during movement of the moving surface said pocket hydrodynamically increases pressure on the moving surface and hydrostatically increases pressure between said backside and an inner surface of the housing.

68. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said face comprises a groove for directing fluid from said face, and wherein said groove comprises a V-shaped configuration.

69. A true-tilting pad pivotally supported and adapted to cooperate with one or more other pads and a fluid within a housing to hydrodynamically and mechanically support a moving surface, said true-tilting pad comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads;

a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and wherein said pocket hydrodynamically causes at least one of a substantially continuous and generally trapezoidal distribution of pressure in the fluid between said true-tilting pad and the moving surface during movement of the moving running surface.

70. A combination thrust bearing and journal bearing for supporting a shaft having a runner, the combination comprising:

a thrust bearing comprising a plurality of true-tilting pads for axially supporting the runner in at least one direction, said plurality of true-tilting pads comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads; and a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom; and a journal bearing comprising a plurality of true-tilting pads for radially supporting the shaft, said plurality of true-tilting pads comprising:

a leading portion adapted to be positioned upstream relative to a direction of movement of the moving surface;

a trailing portion adapted to be positioned downstream relative to the direction of movement of the moving surface;

said leading and said trailing portions tiltable free of mechanical engagement with the other pads; and a face including a border region and extending generally longitudinally between said leading and said trailing portions, said border region including an engagement surface and defining a pocket for hydrodynamically increasing pressure on the moving surface during movement of the moving surface, said pocket having generally longitudinal sidebars and a bottom.

* * * * *